US012059708B2

(12) United States Patent
Bircumshaw et al.

(10) Patent No.: US 12,059,708 B2
(45) Date of Patent: Aug. 13, 2024

(54) ULTRASONIC TRANSDUCERS WITH Q SPOILING

(71) Applicant: eXo Imaging, Inc., Redwood City, CA (US)

(72) Inventors: Brian Bircumshaw, Oakland, CA (US); Sandeep Akkaraju, Wellesley, MA (US); Haesung Kwon, Austin, TX (US)

(73) Assignee: Exo Imaging, Inc., Santa Clara, CA (US)

( * ) Notice: Subject to any disclaimer, the term of this patent is extended or adjusted under 35 U.S.C. 154(b) by 804 days.

(21) Appl. No.: 17/099,545

(22) Filed: Nov. 16, 2020

(65) Prior Publication Data

US 2021/0069748 A1 Mar. 11, 2021

Related U.S. Application Data

(63) Continuation of application No. PCT/US2019/033119, filed on May 20, 2019.

(Continued)

(51) Int. Cl.
*B06B 1/06* (2006.01)
*B06B 1/02* (2006.01)
*G10K 9/122* (2006.01)

(52) U.S. Cl.
CPC .......... *B06B 1/0253* (2013.01); *B06B 1/0666* (2013.01); *G10K 9/122* (2013.01); *B06B 2201/30* (2013.01)

(58) Field of Classification Search
CPC ............................ B06B 1/0253; B06B 1/0666

(Continued)

(56) References Cited

U.S. PATENT DOCUMENTS

| | | | |
|---|---|---|---|
| 2,808,522 | A | 10/1957 | Dranetz |
| 3,088,323 | A | 5/1963 | Walter et al. |

(Continued)

FOREIGN PATENT DOCUMENTS

| | | | |
|---|---|---|---|
| CN | 1445872 | A | 10/2003 |
| CN | 102577436 | A | 7/2012 |

(Continued)

OTHER PUBLICATIONS

PCT/US2020/050374 International Search Report and Written Opinion dated Feb. 2, 2021.

(Continued)

*Primary Examiner* — Derek J Rosenau
(74) *Attorney, Agent, or Firm* — Morgan, Lewis & Bockius LLP

(57) ABSTRACT

Disclosed herein are ultrasonic transducer systems comprising: an ultrasonic transducer comprising a substrate, a diaphragm, and a piezoelectric element; a first electrical circuitry coupled to the ultrasonic transducer, the first electrical circuitry configured for driving the ultrasonic transducer or detecting motion of the diaphragm; a plurality of electrical ports coupled to the ultrasonic transducer; and a second electrical circuitry connected to two or more of the plurality of electrical ports, the electrical circuitry comprising one or more of: a resistor, a capacitor, a switch, and an amplifier, wherein the second electrical circuitry is independent from the first electrical circuitry, and wherein the second electrical circuitry is configured to dampen the motion of the diaphragm.

26 Claims, 15 Drawing Sheets

Related U.S. Application Data

(60) Provisional application No. 62/674,371, filed on May 21, 2018.

(58) Field of Classification Search
USPC ................ 310/317, 322, 324, 334, 365, 366
See application file for complete search history.

(56) References Cited

U.S. PATENT DOCUMENTS

| | | | | |
|---|---|---|---|---|
| 4,156,800 | A | 5/1979 | Sear et al. | |
| 4,211,949 | A | 7/1980 | Brisken et al. | |
| 4,375,042 | A | 2/1983 | Marcus | |
| 4,445,063 | A | 4/1984 | Smith | |
| 4,517,842 | A | 5/1985 | Twomey et al. | |
| 4,630,465 | A | 12/1986 | Hatton | |
| 4,654,554 | A | 3/1987 | Kishi | |
| 4,668,906 | A * | 5/1987 | Ekstrand | H02M 7/219 323/354 |
| 4,709,360 | A | 11/1987 | Martin et al. | |
| 5,488,956 | A | 2/1996 | Bartelt et al. | |
| 5,520,187 | A | 5/1996 | Snyder | |
| 5,548,564 | A | 8/1996 | Smith | |
| 5,825,117 | A | 10/1998 | Ossmann et al. | |
| 5,945,770 | A | 8/1999 | Hanafy | |
| 6,051,895 | A | 4/2000 | Mercier | |
| 6,108,121 | A | 8/2000 | Mansell et al. | |
| 7,382,635 | B2 | 6/2008 | Noda | |
| 7,532,093 | B1 | 5/2009 | Pulskamp et al. | |
| 8,004,158 | B2 | 8/2011 | Hielscher | |
| 8,626,295 | B2 | 1/2014 | Doron et al. | |
| 9,067,779 | B1 | 6/2015 | Rothberg et al. | |
| 9,479,875 | B2 | 10/2016 | Hall et al. | |
| 10,106,397 | B1 | 10/2018 | Kim et al. | |
| 10,648,852 | B2 | 5/2020 | Akkaraju et al. | |
| 10,656,007 | B2 | 5/2020 | Akkaraju et al. | |
| 2002/0109436 | A1 | 8/2002 | Peng et al. | |
| 2004/0039246 | A1 | 2/2004 | Gellman et al. | |
| 2004/0085858 | A1 | 5/2004 | Khuri-Yakub et al. | |
| 2005/0134574 | A1 | 6/2005 | Hill | |
| 2005/0146247 | A1 | 7/2005 | Fisher et al. | |
| 2005/0148132 | A1 | 7/2005 | Wodnicki | |
| 2005/0200242 | A1 | 9/2005 | Degertekin | |
| 2006/0113866 | A1 | 6/2006 | Ganor | |
| 2007/0103697 | A1 | 5/2007 | Degertekin | |
| 2007/0197922 | A1 | 8/2007 | Bradley et al. | |
| 2007/0205698 | A1 | 9/2007 | Chaggares et al. | |
| 2008/0009741 | A1 | 1/2008 | Hyuga | |
| 2008/0048211 | A1 | 2/2008 | Khuri-Yakub et al. | |
| 2009/0001853 | A1 | 1/2009 | Adachi et al. | |
| 2009/0250729 | A1 | 10/2009 | Lemmerhirt et al. | |
| 2010/0148627 | A1 * | 6/2010 | Funasaka | G01H 11/08 310/334 |
| 2010/0168583 | A1 | 7/2010 | Dausch et al. | |
| 2010/0225204 | A1 | 9/2010 | Hamann et al. | |
| 2010/0256501 | A1 | 10/2010 | Degertekin | |
| 2010/0301227 | A1 | 12/2010 | Muntean | |
| 2010/0327695 | A1 | 12/2010 | Goel et al. | |
| 2011/0051461 | A1 | 3/2011 | Buchwald et al. | |
| 2011/0218594 | A1 * | 9/2011 | Doron | G10K 9/122 310/334 |
| 2012/0091543 | A1 | 4/2012 | Torashima et al. | |
| 2012/0103096 | A1 | 5/2012 | Kandori | |
| 2012/0127136 | A1 | 5/2012 | Schneider et al. | |
| 2012/0187508 | A1 | 7/2012 | Adler et al. | |
| 2012/0206014 | A1 | 8/2012 | Bibl et al. | |
| 2012/0250454 | A1 | 10/2012 | Rohling et al. | |
| 2012/0289897 | A1 | 11/2012 | Friend et al. | |
| 2012/0319174 | A1 | 12/2012 | Wang | |
| 2013/0039147 | A1 | 2/2013 | Witte et al. | |
| 2013/0234559 | A1 | 9/2013 | Ermolov | |
| 2013/0293065 | A1 | 11/2013 | Hajati et al. | |
| 2013/0294201 | A1 | 11/2013 | Hajati | |
| 2013/0331705 | A1 | 12/2013 | Fraser | |
| 2014/0019072 | A1 | 1/2014 | Alles | |
| 2014/0117812 | A1 | 5/2014 | Hajati | |
| 2014/0145561 | A1 | 5/2014 | Jin et al. | |
| 2014/0219063 | A1 | 8/2014 | Hajati et al. | |
| 2014/0220723 | A1 | 8/2014 | Liu et al. | |
| 2014/0225476 | A1 | 8/2014 | Degertekin et al. | |
| 2014/0328504 | A1 | 11/2014 | Stephanou et al. | |
| 2015/0097468 | A1 | 4/2015 | Hajati et al. | |
| 2015/0250452 | A1 | 9/2015 | Jin et al. | |
| 2015/0265245 | A1 | 9/2015 | Von Ramm et al. | |
| 2016/0027991 | A1 | 1/2016 | Suzuki | |
| 2016/0045935 | A1 | 2/2016 | Yoon et al. | |
| 2016/0105748 | A1 | 4/2016 | Pal et al. | |
| 2016/0107194 | A1 | 4/2016 | Panchawagh et al. | |
| 2016/0136686 | A1 | 5/2016 | Brock-Fisher | |
| 2016/0136687 | A1 | 5/2016 | Lewis, Jr. et al. | |
| 2016/0262725 | A1 | 9/2016 | Boser et al. | |
| 2017/0021391 | A1 | 1/2017 | Guedes et al. | |
| 2017/0209121 | A1 | 7/2017 | Davis, Sr. et al. | |
| 2017/0232474 | A1 | 8/2017 | Oralkan et al. | |
| 2017/0309808 | A1 | 10/2017 | Hada et al. | |
| 2017/0319180 | A1 | 11/2017 | Henneken et al. | |
| 2017/0322290 | A1 | 11/2017 | Ng et al. | |
| 2017/0368574 | A1 | 12/2017 | Sammoura et al. | |
| 2018/0153510 | A1 | 6/2018 | Haque et al. | |
| 2018/0153512 | A1 | 6/2018 | Akkaraju et al. | |
| 2019/0176193 | A1 | 6/2019 | Shulepov et al. | |
| 2019/0316957 | A1 | 10/2019 | Akkaraju et al. | |
| 2019/0316958 | A1 | 10/2019 | Akkaraju et al. | |
| 2020/0205776 | A1 | 7/2020 | Dekker et al. | |
| 2020/0225082 | A1 | 7/2020 | Akkaraju et al. | |
| 2020/0249079 | A1 | 8/2020 | Akkaraju et al. | |
| 2020/0266798 | A1 | 8/2020 | Shelton et al. | |
| 2021/0078042 | A1 | 3/2021 | Bircumshaw et al. | |
| 2021/0151661 | A1 | 5/2021 | Kwon et al. | |
| 2021/0172788 | A1 | 6/2021 | Akkaraju et al. | |
| 2021/0236090 | A1 | 8/2021 | Akkaraju et al. | |
| 2021/0364348 | A1 | 11/2021 | Akkaraju et al. | |
| 2022/0193722 | A1 | 6/2022 | Bircumshaw et al. | |
| 2022/0205836 | A1 | 6/2022 | Akkaraju et al. | |

FOREIGN PATENT DOCUMENTS

| | | | |
|---|---|---|---|
| CN | 104271266 | A | 1/2015 |
| CN | 105310718 | A | 2/2016 |
| CN | 106500824 | A | 3/2017 |
| CN | 106999163 | A | 8/2017 |
| EP | 3453056 | A1 | 3/2019 |
| JP | S61223683 | A | 10/1986 |
| JP | S6276392 | A | 4/1987 |
| JP | H02218983 | A | 8/1990 |
| JP | H06350155 | A | 12/1994 |
| JP | 2007088805 | A | 4/2007 |
| JP | 2007510324 | A | 4/2007 |
| JP | 2009165212 | A | 7/2009 |
| JP | 2012129662 | A | 7/2012 |
| JP | 2013123150 | A | 6/2013 |
| JP | 2014000122 | A | 1/2014 |
| JP | 2014127921 | A | 7/2014 |
| JP | 2016503312 | A | 2/2016 |
| JP | 2018046512 | A | 3/2018 |
| WO | WO-2006123300 | A2 | 11/2006 |
| WO | WO-2007099696 | A1 | 9/2007 |
| WO | WO-2011026187 | A1 | 3/2011 |
| WO | WO-2011033887 | A1 | 3/2011 |
| WO | WO-2012117996 | A1 | 9/2012 |
| WO | WO-2013043906 | A1 | 3/2013 |
| WO | WO-2013158348 | A1 | 10/2013 |
| WO | WO-2015131083 | A1 | 9/2015 |
| WO | WO-2017025438 | A1 | 2/2017 |
| WO | WO-2017132517 | A1 | 8/2017 |
| WO | WO-2017182344 | A1 | 10/2017 |
| WO | WO-2017216139 | A1 | 12/2017 |
| WO | WO-2018102223 | A1 | 6/2018 |
| WO | WO-2019164721 | A1 | 8/2019 |
| WO | WO-2019199397 | A1 | 10/2019 |
| WO | WO-2019199398 | A1 | 10/2019 |
| WO | WO-2019226547 | A1 | 11/2019 |

(56) References Cited

FOREIGN PATENT DOCUMENTS

WO WO-2020028580 A1 2/2020
WO WO-2021050853 A1 3/2021

OTHER PUBLICATIONS

U.S. Appl. No. 16/837,800 Office Action dated May 7, 2021.
U.S. Appl. No. 17/180,308 Office Action dated Dec. 10, 2021.
Co-pending U.S. Appl. No. 17/215,776, inventors Bircumshaw; Brian et al., filed Mar. 29, 2021.
Co-pending U.S. Appl. No. 17/218,656, inventors Kwon; Haesung et al., filed Mar. 31, 2021.
Co-pending U.S. Appl. No. 17/364,381, inventors Mantravadi; Naresh et al., filed Jun. 30, 2021.
Co-pending U.S. Appl. No. 17/364,397, inventors Kwon; Haesung et al., filed Jun. 30, 2021.
Hill et al. The Role Radius of Curvature Plays in Thiolated Oligonucleotide Loading on Gold Nanopartictes. ACS Nano 3(2):418-424 (2009) Retrieved on Sep. 2, 2021 from https://www.ncbi.nlm.nih.gov/pmc/articles/PMC3241534.
PCT/US2021/024667 International Search Report and Written Opinion dated Jul. 8, 2021.
PCT/US2021/025109 International Search Report and Written Opinion dated Jul. 7, 2021.
PCT/US2021/039977 International Search Report and Written Opinion dated Oct. 6, 2021.
PCT/US2021/039994 International Search Report and Written Opinion dated Nov. 5, 2021.
Zhang et al. Double-SOI wafer-bonded CMUTs with improved electrical safety and minimal roughness of dielectric and electrode surfaces. Journal of microelectromechanical systems 21(3):668-680 (2012).
APC International, Ceramic manufacturing series—poling PZT ceramics. https://www.americanpiezo.com/blog/ceramic-manufacturing-series-poling-pzt-ceramics/ [1-3] (2016).
Assef et al., A reconfigurable arbitrary waveform generator using PWM modulation for ultrasound research. BioMedical Engineering OnLine 12:24 [1-13] (2013).
Choudhry et al., Comparison of tissue harmonic imaging with conventional US in abdominal disease. RadioGraphics: Imaging and Therapeutic Technology 20:1127-1135 (2000).
Dahl, Ultrasound beamforming and image formation. http://people.duke.edu/-jjd/RSNA_USbeamforming.pdf [Slide presentation] (c. 2005).
Dausch et al., Theory and operation of 2-D array piezoelectric micromachined ultrasound transducers. IEEE Transactions on Ultrasonics, Ferroelectrics, and Frequency Control 55(11):2484-2492 (2008).
Doerry, Generating nonlinear FM chirp waveforms for radar. Sandia Report, SAND2006-5856:1-34 (2006).
Felix et al., Biplane ultrasound arrays with integrated multiplexing solution for enhanced diagnostic accuracy in endorectal and transvaginal imaging. http://www.vermon.com/vermon/publications/Felix_UFFC_2005.pdf (2005).
Goldman, Apple's Lightning connector and you: what you should know. CNET Sep. 19, 2012: https://www.cnet.com/news/apples-lightning-connector-and-you-what-you-should-know/ (2012).
Guedes et al., Aluminum nitride pMUT based on a flexurally-suspended membrane. IEEE 16th International Solid-State Sensors, Actuators and Microsystems Conference:12169346 (2011).
Hajati et al., Three-dimensional micro electromechanical system piezoelectric ultrasound transducer. Appl. Phys. Lett. 101:253101 (2012); doi: 10.1063/1.4772469 (2012).
Harput, Use of chirps in medical ultrasound imaging. Ultrasound Group, School of Electronic and Electrical Engineering, University of Leeds, PhD Thesis, Dec. 2012.
Karki, Signal conditioning piezoelectric sensors. Texas Instruments Application report, SLA033A:1-5 (2000).
Khuri-Yakub et al., Capacitive micro machined ultrasonic transducers for medical imaging and therapy. Journal of Micromech Microeng. 21(5):054004-054014 (2011).
Lach et al., Piezoelectric materials for ultrasonic probes. http://www.ndt.net/article/platte2/platte2.htm NDTnet 1(9):1-9 (1996).
Lee et al., Wafer-to-wafer alignment for three-dimensional integration: a review. Journal of MicroElectroMechanical Systems 20(4):885-898 (2011).
Lu et al., High frequency piezoelectric micromachined ultrasonic transducer array for intravascular ultrasound imaging. Proceedings of the IEEE International Conference on Micro Electro Mechanical Systems (MEMS):06765748 (2014).
Martin, Introduction to B-mode imaging. Cambridge University Press; Diagnostic Ultrasound: Physics and equipment, 2nd Edition. Chapter 1:1-10 (2010).
Mina, High frequency transducers from PZT films. Materials Science and Engineering Thesis; Pennsylvania State University:1-199 (2007).
Moazzami et al., Electrical characteristics of ferroelectric PZT thin films for DRAM applications. IEEE Transaction on Electron Devices 39(9):2044-2049 (1992).
Orenstein Scanning in pain—sonographers seek relief from job-related hazard. Radiology Today 10(8):24 (2009).
Ovland, Coherent plane-wave compounding in medical ultrasound imaging. NTNU—Trondheim, Norwegian University of Science and Technology, Master of Science Thesis, 1-62 (Jun. 2012).
PCT/US2017/063163 International Search Report and Written Opinion dated Feb. 15, 2018.
PCT/US2019/021501 International Search Report and Written Opinion dated Jul. 12, 2019.
PCT/US2019/021515 International Search Report and Written Opinion dated May 31, 2019.
PCT/US2019/033119 International Search Report and Written Opinion dated Aug. 9, 2019.
PCT/US2019/044528 International Search Report and Written Opinion dated Oct. 16, 2019.
PCT/US2020/050374 Invitation to Pay Additional Fees dated Nov. 13, 2020.
Pye et al., Adaptive time gain compensation for ultrasonic imaging. Ultrasound in Medicine and Biology 18(2):205-212 [abstract] (1992).
Rodriguez et al., Low cost matching network for ultrasonic transducers. Physics Procedia 3:1025-1031 (2010).
Smyth, Design and modeling of a PZT thin film based piezoelectric micromachined ultrasonic transducer (PMUT). MSME Thesis, MIT:1-156 (2012).
Spectral doppler. http://www.echocardiographer.org/Echo%20Physics/spectral%20doppler.html (2017).
Szabo. Diagnostic ultrasound imaging: inside out. Elsevier Academic Press, ISBN: 0-12-680145-2 (572 pgs) (2014).
Trots et al., Synthetic aperture method in ultrasound imaging. InTech Press; Ultrasound Imaging, Masayuki Tanabe (Ed.). http://www.intechopen.com/books/ultrasound-imaging/synthetic-aperture-method-in-ultrasound-imaging. Chapter 3:37-56 (2011).
U.S. Appl. No. 15/820,319 Office Action dated May 14, 2020.
U.S. Appl. No. 15/951,118 Office Action dated Sep. 20, 2019.
U.S. Appl. No. 15/951,121 Office Action dated May 6, 2019.
U.S. Appl. No. 15/951,121 Office Action dated Nov. 19, 2019.
U.S. Appl. No. 16/833,333 Office Action dated Sep. 8, 2020.
Wang et al., Broadband piezoelectric micromachined ultrasonic transducer (pMUT) using mode-merged design. Proceedings of the 10th IEEE International Conference on Nano/Micro Engineered and Molecular Systems (IEEE-NEMS 2015):15260900. Xi'an, China, Apr. 7-11, 2015.
Wang et al., Zero-bending piezoelectric micromachined ultrasonic transducer (pMUT) with enhanced transmitting performance. Journal of Microelectromechanical Systems 24(6):2083-2091 (2015).

* cited by examiner

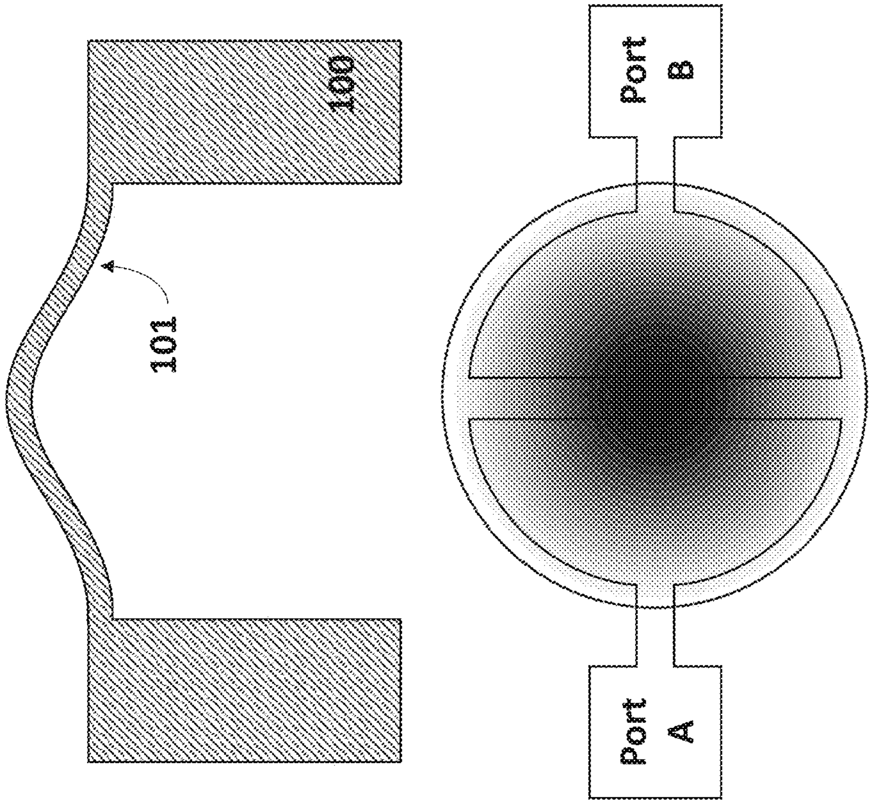
Fig 3A. Primary drum mode
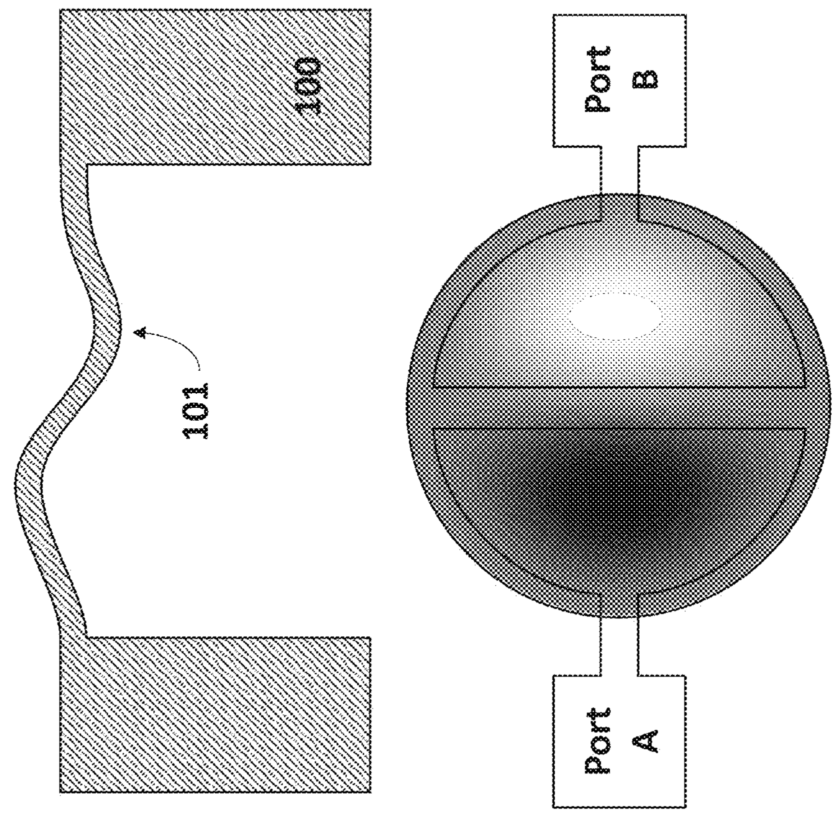
Fig 3B. First asymmetric harmonic

Fig 4A. Q-spoiling using a capacitively coupled resistor.
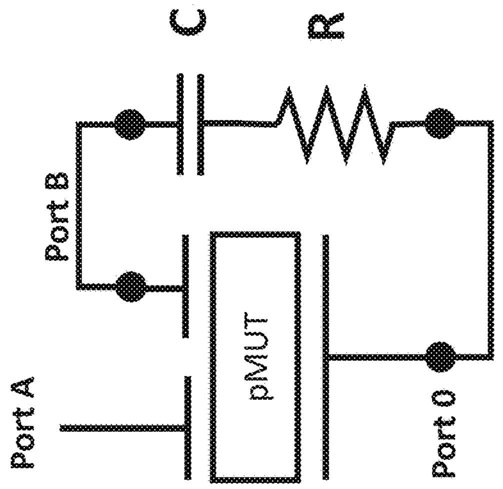
Fig 4C. Q-spoiling using a capacitively coupled resistor with a switch.
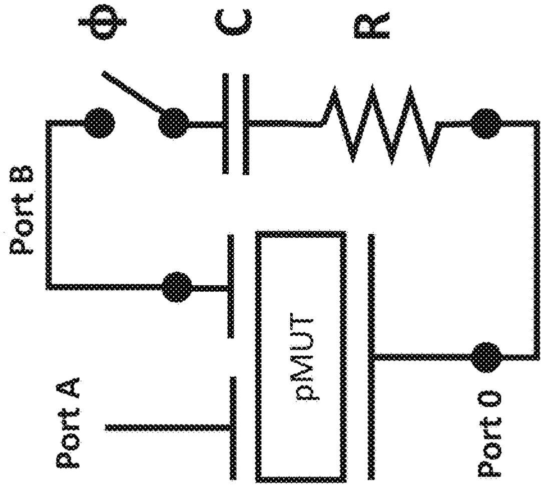
Fig 4B. Q-spoiling using a short between Port B and 0 regulated by a switch.
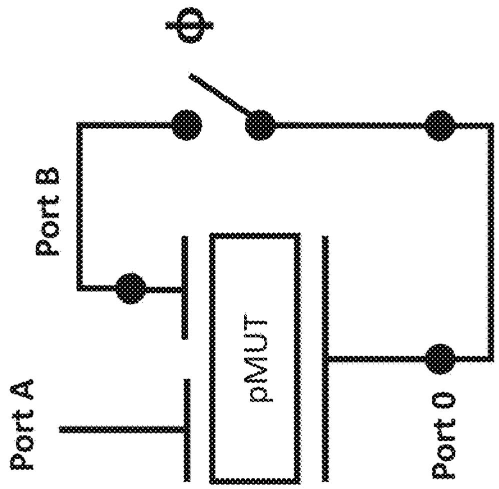

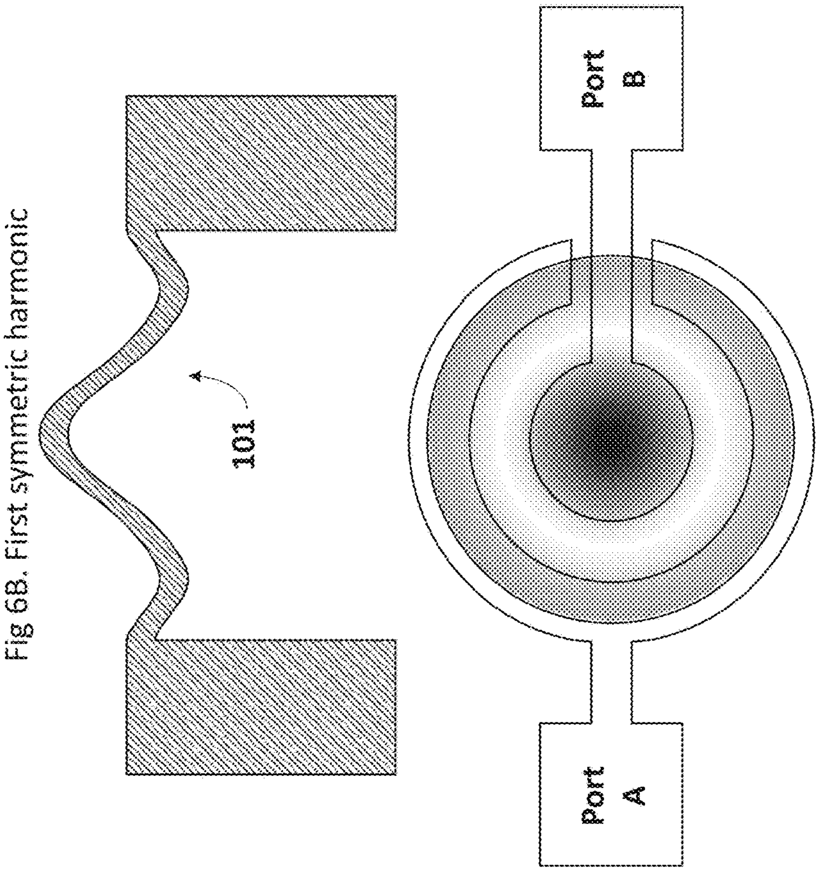
Fig 6B. First symmetric harmonic
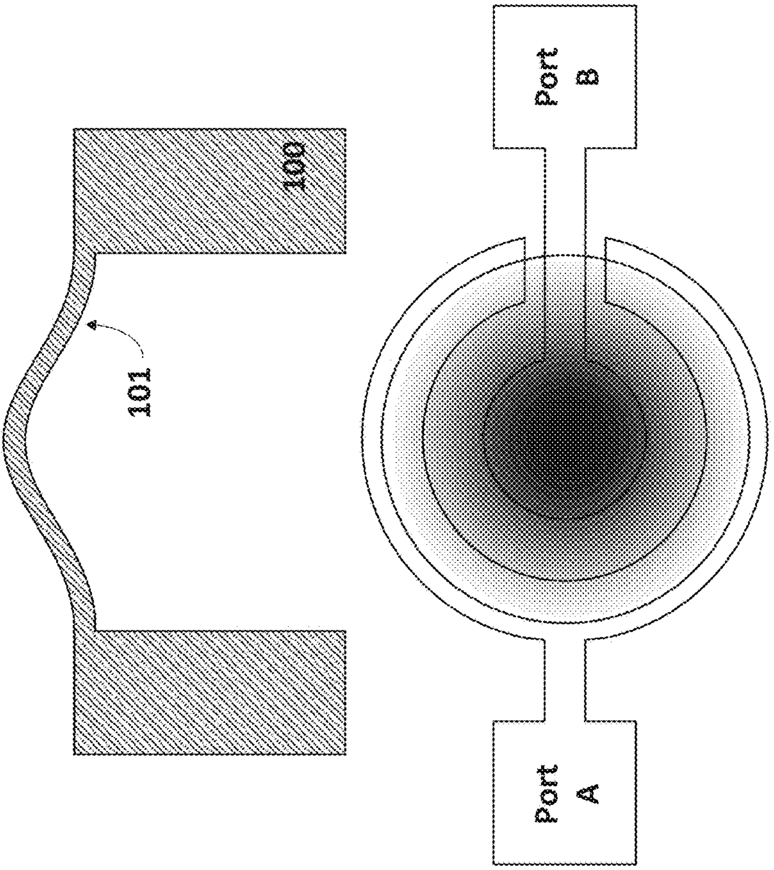
Fig 6A. Primary drum mode

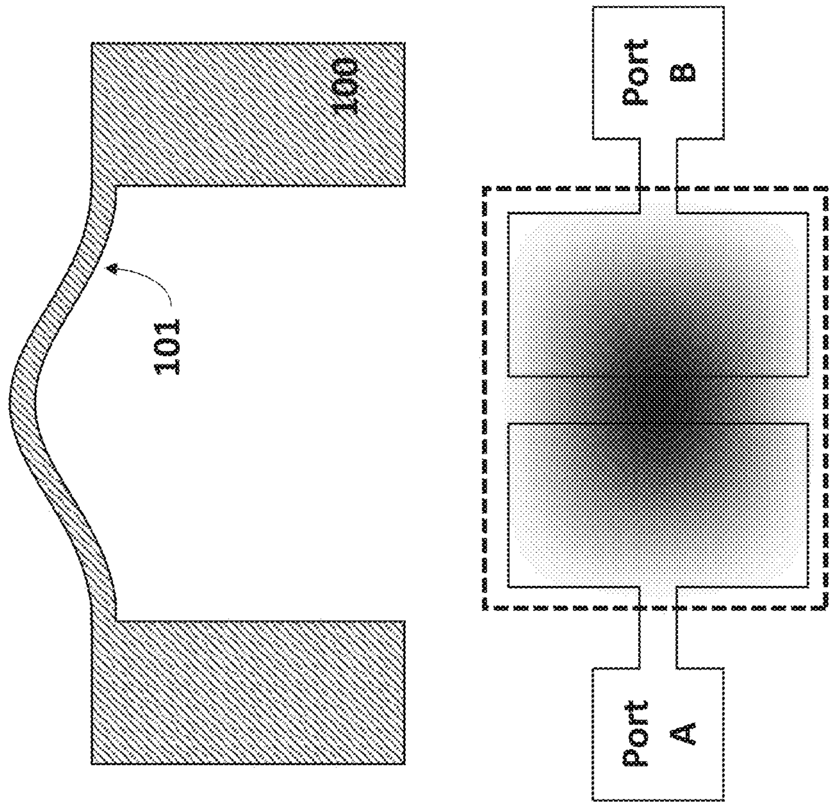
Fig 8A. Primary drum mode
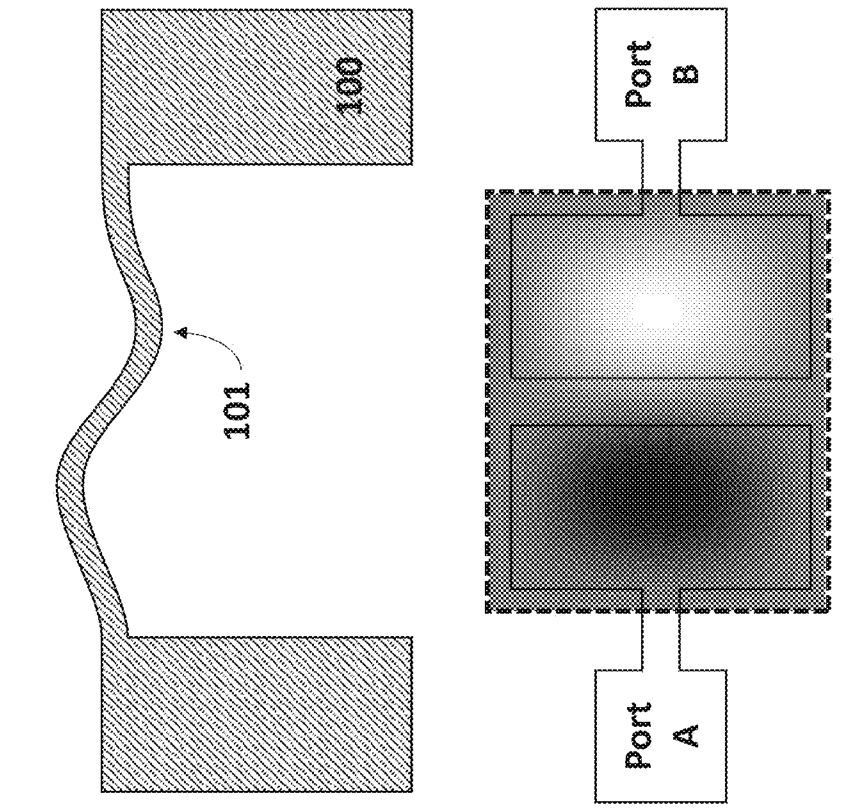
Fig 8B. First “asymmetric” harmonic Fig 10A. Primary drum mode
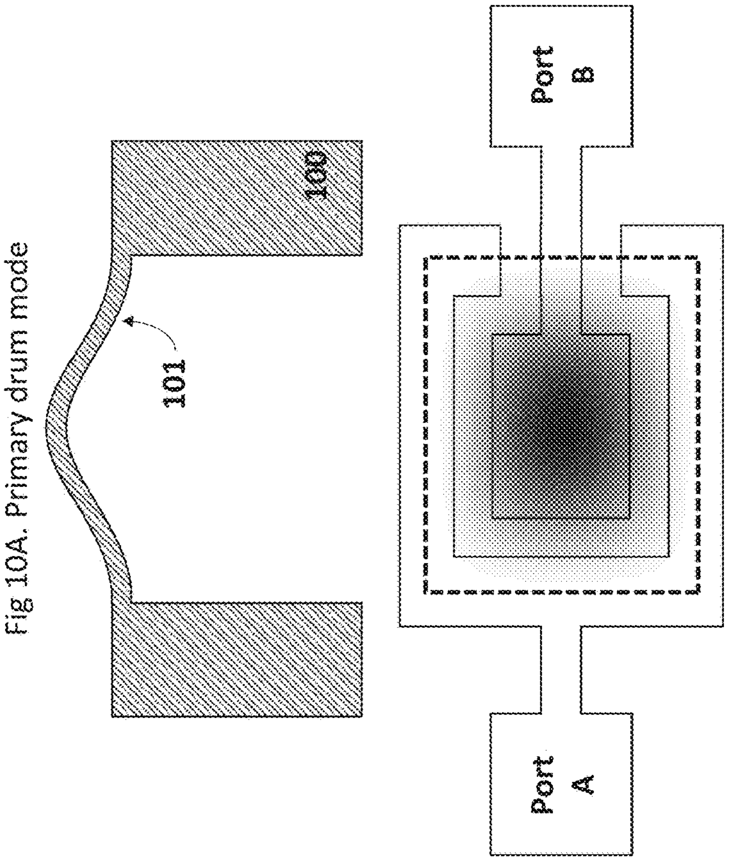
Fig 10B. First "symmetric" harmonic
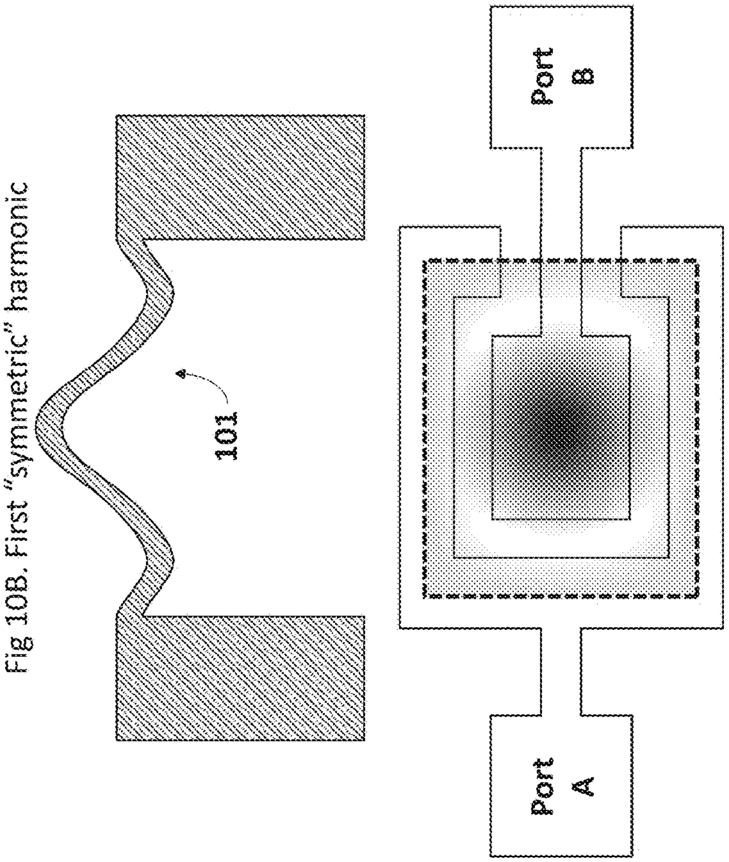

Fig. 11A. Q-spoiling using a capacitively coupled resistor.
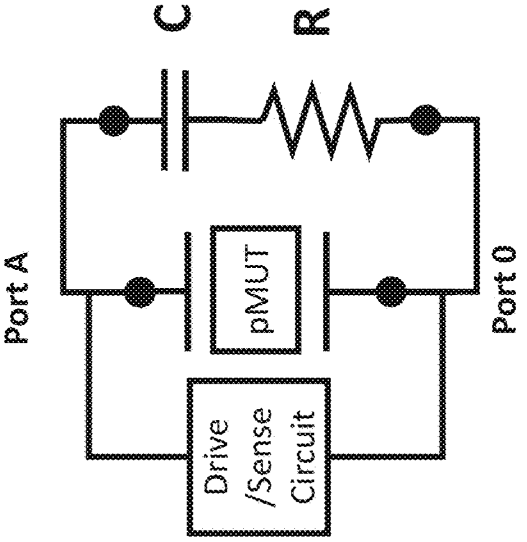
Fig 11B. Q-spoiling using a capacitively coupled resistor with a switch.
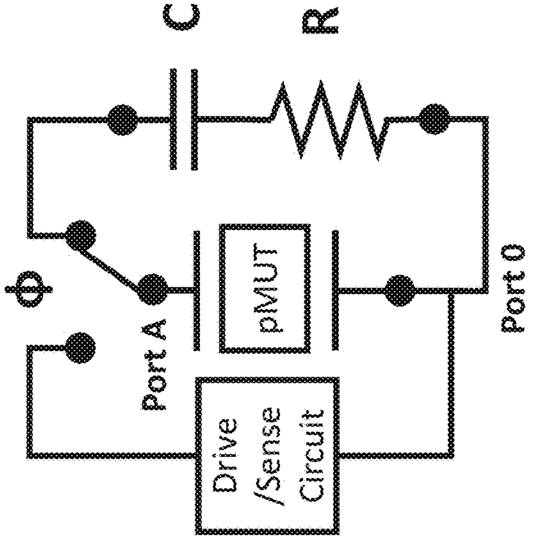
Fig 11C. Q-spoiling using a short between Port A and 0 regulated by a switch.
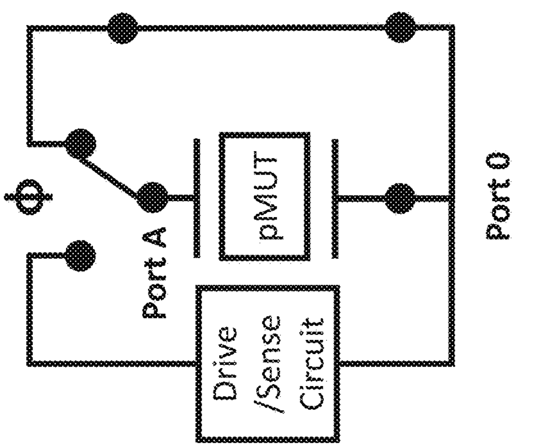

Fig 14A. Q-spoiling using a capacitively coupled resistor.

Fig 14B. Q-spoiling using a capacitively coupled resistor with a switch.

Fig 14C. Q-spoiling using a timed gate to remove charge and resist motion.

ULTRASONIC TRANSDUCERS WITH Q SPOILING

CROSS-REFERENCE

This application is a continuation of PCT/US2019/033119, filed May 20, 2019, which claims the benefit of U.S. Provisional Application No. 62/674,371, filed May 21, 2018, which are incorporated by reference in their entirety.

BACKGROUND OF THE INVENTION

An ultrasound transducer commonly includes a substrate which forms a backing, absorption or reflection medium, a layer of piezoelectric material which is provided with electrodes on its front and rear, and at least one layer for acoustic impedance matching which can be between the piezoelectric material and the substrate.

Piezoelectric micromachined ultrasonic transducer (pMUT) array(s) offer immense opportunity in the field of ultrasonics due to their efficiency in transducing between the electrical and acoustic energy domains. Due to construction, however, pMUTs may have higher quality factors (i.e., Qs) than bulk piezoelectric crystal transducers.

SUMMARY OF THE INVENTION

Higher Q than traditional piezoelectric crystal ultrasonic transducers can be deleterious to the pMUT's functioning, as it reduces the axial image resolution and/or induces undesired noise in images.

The present disclosure herein includes systems and methods for reducing a pMUT's Q. In some embodiments, the system and methods herein are not dependent on the transducer technology, they can be applied to transducers other than pMUTs. In some embodiments, the system and methods herein are not limited to reducing the transducer's Qs; with suitable circuitry, the systems and methods herein can be used to modify the transducer's dynamic behavior in an unlimited number of ways.

In one aspect, disclosed herein are ultrasonic transducer systems comprising: an ultrasonic transducer comprising a substrate, a diaphragm, and a piezoelectric element; a first electrical circuitry coupled to the to the ultrasonic transducer, the first electrical circuitry configured for driving the ultrasonic transducer or detecting motion of the diaphragm; a plurality of electrical ports coupled to the ultrasonic transducer; and a second electrical circuitry connected to two or more of the plurality of electrical ports, the electrical circuitry comprising one or more of: a resistor, a capacitor, a switch, and an amplifier; wherein the second electrical circuitry is independent from the first electrical circuitry, and wherein the second electrical circuitry is configured to dampen the motion of the diaphragm. In some embodiments, the ultrasonic transducer is a piezoelectric micromachined ultrasonic transducer (pMUT). In some embodiments, the second electrical circuitry comprises a resistor. In some embodiments, the second electrical circuitry comprises a resistor coupled to the ultrasonic transducer through a capacitor. In some embodiments, the second electrical circuitry comprises a switch, a resistor, and a capacitor in series. In some embodiments, the switch is configured to leave one or more of the plurality of ports floating when open and short the one or more of the plurality of ports to the resistor and the capacitor when closed. In some embodiments, the motion of the diaphragm is dampened when the switch is closed. In some embodiments, the second electrical circuitry comprises a switch. In some embodiments, the switch is configured to leave one or more of the plurality of ports floating when open and short the one or more of the plurality of ports to a DC voltage when closed. In some embodiments, the motion of the diaphragm is ceased when the switch is closed. In some embodiments, the second electrical circuitry comprises an amplifier. In some embodiments, the amplifier is configured to sense the motion of the diaphragm and utilizes active feedback to dampen the transducer based on the sensed motion of the diaphragm. In some embodiments, the second electrical circuitry is activated when the diaphragm is in motion. In some embodiments, the second electrical circuitry is not activated when the motion of diaphragm is less than a predetermined threshold. In some embodiments, the plurality of electrical ports comprises at least one port above the piezoelectric element. In some embodiments, the plurality of electrical ports comprises at least one port below the piezoelectric element. In some embodiments, the plurality of electrical ports comprises two ports or three ports. In some embodiments, the plurality of electrical ports comprises four ports, five ports, six ports, or any other integer number of ports.

In another aspect, disclosed herein are methods for damping motion of an ultrasonic transducer, the method comprising: coupling a plurality of electrical ports to the ultrasonic transducer; connecting a first electrical circuitry to two or more of the plurality of electrical ports, the electrical circuitry comprising one or more of: a resistor, a capacitor, a switch, and an amplifier, wherein the first electrical circuitry is independent from a second electrical circuitry, the second electrical circuitry configured for driving the ultrasonic transducer or detecting motion of the diaphragm; and damping the motion of the ultrasonic transducer using the first electrical circuitry. In some embodiments, connecting a first electrical circuitry to the two or more of the plurality of electrical ports comprises connecting a resistor and a capacitor in series to the two or more of the plurality of electrical ports. In some embodiments, connecting a first electrical circuitry to the two or more of the plurality of electrical ports comprises connecting a switch, a resistor, and a capacitor in series to the to the two or more of the plurality of electrical ports. In some embodiments, the plurality of electrical ports comprises at least one port above the piezoelectric element. In some embodiments, the plurality of electrical ports comprises at least one port below the piezoelectric element. In some embodiments, the plurality of electrical ports comprises two ports or three ports. In some embodiments, the plurality of electrical ports comprises four ports, five ports, six ports, or any other number of ports.

In another aspect, disclosed herein are electrical transducer systems comprising: an electrical transducer comprising a substrate, a diaphragm, and a piezoelectric element; a first electrical circuitry coupled to the to the electrical transducer, the first electrical circuitry configured for driving the electrical transducer or detecting motion of the diaphragm; a plurality of electrical ports coupled to the electrical transducer; and a second electrical circuitry connected to two or more of the plurality of electrical ports, the electrical circuitry comprising one or more of: a resistor, a capacitor, a switch, and an amplifier; wherein the second electrical circuitry is independent from the first electrical circuitry, and wherein the second electrical circuitry is configured to dampen the motion of the diaphragm. In some embodiments, the electrical transducer is selected from the group consisting of a capacitive transducer, a piezo-resistive transducer, a thermal transducer, an optical transducer, and a radioactive transducer. In some embodiments, the second electrical circuitry comprises a resistor. In some embodiments, the second electrical circuitry comprises a resistor coupled to the electrical transducer through a capacitor. In some embodiments, the second electrical circuitry comprises a switch, a resistor, and a capacitor in series. In some embodiments, the switch is configured to leave one or more of the plurality of ports floating when open and short the one or more of the plurality of ports to the resistor and the capacitor when closed. In some embodiments, the motion of the diaphragm is dampened when the switch is closed. In some embodiments, the second electrical circuitry comprises a switch. In some embodiments, the switch is configured to leave one or more of the plurality of ports floating when open and short the one or more of the plurality of ports to a DC voltage when closed. In some embodiments, the motion of the diaphragm is ceased when the switch is closed. In some embodiments, the second electrical circuitry comprises an amplifier. In some embodiments, the amplifier is configured to sense the motion of the diaphragm and utilizes active feedback to dampen the transducer based on the sensed motion of the diaphragm. In some embodiments, the second electrical circuitry is activated when the diaphragm is in motion. In some embodiments, the second electrical circuitry is not activated when the motion of diaphragm is less than a predetermined threshold. In some embodiments, the plurality of electrical ports comprises at least one port above the piezoelectric element. In some embodiments, the plurality of electrical ports comprises at least one port below the piezoelectric element. In some embodiments, the plurality of electrical ports comprises two ports or three ports. In some embodiments, the plurality of electrical ports comprises four ports, five ports, six ports, or any other integer number of ports.

In another aspect, disclosed herein are methods for damping motion of an electrical transducer, the method comprising: coupling a plurality of electrical ports to the electrical transducer; connecting a first electrical circuitry to two or more of the plurality of electrical ports, the electrical circuitry comprising one or more of: a resistor, a capacitor, a switch, and an amplifier, wherein the first electrical circuitry is independent from a second electrical circuitry, the second electrical circuitry configured for driving the electrical transducer or detecting motion of the diaphragm; and damping the motion of the electrical transducer using the first electrical circuitry. In some embodiments, the electrical transducer is selected from the group consisting of a capacitive transducer, a piezo-resistive transducer, a thermal transducer, an optical transducer, and a radioactive transducer. In some embodiments, connecting a first electrical circuitry to the two or more of the plurality of electrical ports comprises connecting a resistor and a capacitor in series to the two or more of the plurality of electrical ports. In some embodiments, connecting a first electrical circuitry to the two or more of the plurality of electrical ports comprises connecting a switch, a resistor, and a capacitor in series to the to the two or more of the plurality of electrical ports. In some embodiments, the plurality of electrical ports comprises at least one port above the piezoelectric element. In some embodiments, the plurality of electrical ports comprises at least one port below the piezoelectric element. In some embodiments, the plurality of electrical ports comprises two ports or three ports. In some embodiments, the plurality of electrical ports comprises four ports, five ports, six ports, or any other number of ports.

BRIEF DESCRIPTION OF THE DRAWINGS

A better understanding of the features and advantages of the present subject matter will be obtained by reference to the following detailed description that sets forth illustrative embodiments and the accompanying drawings of which:

FIGS. 3A-3B shows an exemplary embodiment of harmonics of the pMUT system in FIGS. 1A-1B, in cross-section (top) and layout (bottom) views.

FIGS. 4A-4C show exemplary embodiments of Q-spoiling in a three-port pMUT system;

FIGS. 6A-6B shows exemplary embodiments of harmonics of the pMUT system in FIGS. 5A-5B, in cross-section (top) and layout (bottom) views;

FIGS. 8A-8B shows exemplary embodiments of harmonics of the pMUT system in FIGS. 7A-7B, in cross-section (top) and layout (bottom) views;

FIGS. 10A-10B show exemplary embodiments of harmonics of pMUT systems in FIGS. 9A-9B, in cross-section (top) and layout (bottom) views.

FIGS. 11A-11C show exemplary embodiments of Q-spoiling in a two-port pMUT system;

DETAILED DESCRIPTION OF THE INVENTION

Figure 1B:
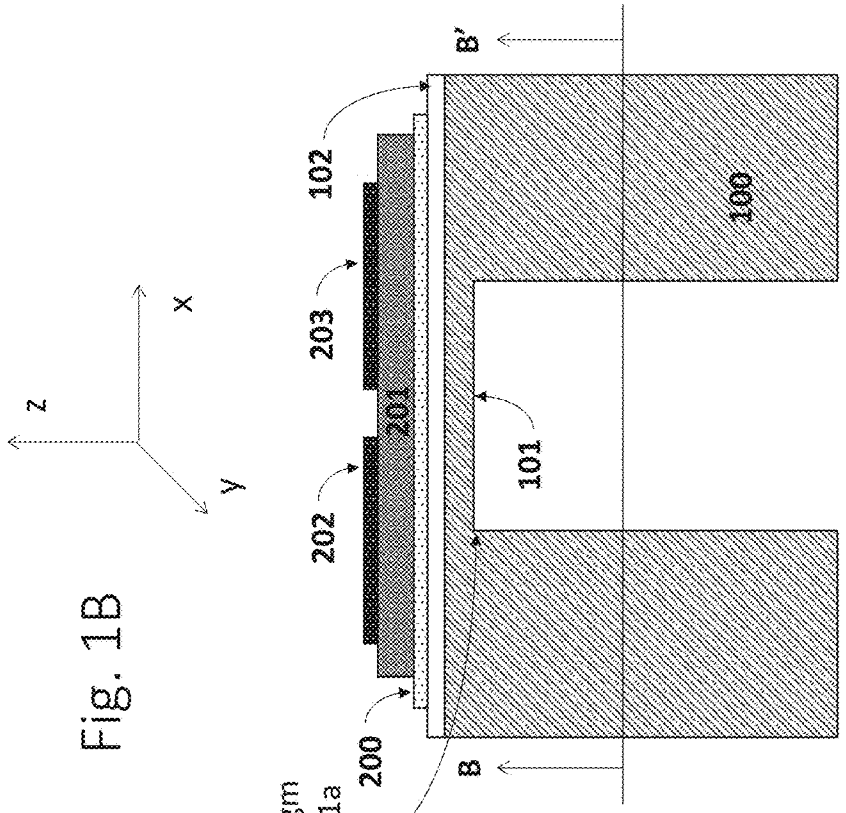
FIGS. 1A-1B show an exemplary embodiment of an ultrasonic transducer system herein, in this case, a pMUT with a circular diaphragm and two side-by-side semicircular top electrodes in layout and cross-section views.

In some embodiments, a transducer herein is a device that converts a physical variation in one energy domain into a physical variation in a different domain. A piezoelectric micromachined ultrasonic transducer (pMUT), for example, converts voltage variations into mechanical vibrations of a diaphragm via the piezoelectric effect. These vibrations of the diaphragm result in pressure waves in any gas, liquid, or solid adjoining the diaphragm. Conversely, pressure waves in the adjoining media may cause mechanical vibration of the diaphragm. The strain in the piezoelectric material on the pMUT's diaphragm may in turn result in variations in charge on the pMUT's electrodes, which can be sensed.

In certain embodiments, disclosed herein are electrical transducers, in which one of the two energy domains is electrical. In some embodiments, Ultrasonic transducers are a subset of electrical transducers. For example, the pMUT is an electrical transducer as the electrical domain is one of the energy domains the pMUT converts between while the other domain being mechanical, e.g., mechanical pressure.

The present disclosure includes methods of changing the dynamic behavior of an electrical transducer. In some embodiments, the methods herein include adding additional ports to the transducer and adding electrical circuit elements to these ports. In some embodiments, disclosed herein are electrical transducers with additional ports and electrical circuit elements added to these ports. In some embodiments, the circuit elements herein include but are not limited to: a resistor, a capacitor, a two-way switch, a three-way switch, an inductor, an amplifier, a diode, a voltage source, a timer, and a logic gate. In some embodiments, the electrical circuit elements added to the electrical transducer ports modify the dynamic behavior of the transducer.

In some embodiments, the methods herein are applied to electrical transducers other than pMUTs, including but not limited to capacitive, piezo-resistive, thermal, optical, radioactive transducers. A piezo-resistive pressure transducer, for example, converts mechanical pressure variations into electrical resistance variations via the piezo-resistance effect. Because the resistance variations are in the electrical domain, the piezo-resistive pressure transducer qualifies as an electrical transducer.

The present disclosure, in some embodiments, advantageously allows manipulation of dynamic behavior, e.g., Qs, damping, loading, etc. of ultrasonic transducers. Such manipulation, in some embodiments, involves electrical and mechanical energy domains. Advantages of such manipulation include but are not limited to improved image quality, reduced image noise, reduced imaging time, and saved energy.

In some embodiments, the systems and methods herein reduce a Q (equivalently herein as Q-spoiling) of a pMUT transducer by 10%, 20%, 30%, 40%, 50%, or even more, including increments therein, of traditional pMUTs. In some embodiments, the systems and methods herein improve damping of a pMUT transducer by 10%, 20%, 30%, 40%, 50%, or even more, including increments therein, of traditional pMUTs.

Disclosed herein, in some embodiments, are ultrasonic transducer systems comprising: an ultrasonic transducer comprising a substrate, a diaphragm, and a piezoelectric element; a first electrical circuitry coupled to the to the ultrasonic transducer, the first electrical circuitry configured for driving the ultrasonic transducer or detecting motion of the diaphragm; a plurality of electrical ports coupled to the ultrasonic transducer; and a second electrical circuitry connected to two or more of the plurality of electrical ports, the electrical circuitry comprising one or more of: a resistor, a capacitor, a switch, and an amplifier; wherein the second electrical circuitry is independent from the first electrical circuitry, and wherein the second electrical circuitry is configured to dampen the motion of the diaphragm. In some embodiments, the ultrasonic transducer is a piezoelectric micromachined ultrasonic transducer (pMUT). In some embodiments, the second electrical circuitry comprises a resistor. In some embodiments, the second electrical circuitry comprises a resistor coupled to the ultrasonic transducer through a capacitor. In some embodiments, the second electrical circuitry comprises a switch, a resistor, and a capacitor in series. In some embodiments, the switch is configured to leave one or more of the plurality of ports floating when open and short the one or more of the plurality of ports to the resistor and the capacitor when closed. In some embodiments, the motion of the diaphragm is dampened when the switch is closed. In some embodiments, the second electrical circuitry comprises a switch. In some embodiments, the switch is configured to leave one or more of the plurality of ports floating when open and short the one or more of the plurality of ports to a DC voltage when closed. In some embodiments, the motion of the diaphragm is ceased when the switch is closed. In some embodiments, the second electrical circuitry comprises an amplifier. In some embodiments, the amplifier is configured to sense the motion of the diaphragm and utilizes active feedback to dampen the transducer based on the sensed motion of the diaphragm. In some embodiments, the second electrical circuitry is activated when the diaphragm is in motion. In some embodiments, the second electrical circuitry is not activated when the motion of diaphragm is less than a predetermined threshold. In some embodiments, the plurality of electrical ports comprises at least one port above the piezoelectric element. In some embodiments, the plurality of electrical ports comprises at least one port below the piezoelectric element. In some embodiments, the plurality of electrical ports comprises two ports or three ports. In some embodiments, the plurality of electrical ports comprises four ports, five ports, six ports, or any other integer number of ports.

Disclosed herein, in some embodiments, are methods for damping motion of an ultrasonic transducer, the method comprising: coupling a plurality of electrical ports to the ultrasonic transducer; connecting a first electrical circuitry to two or more of the plurality of electrical ports, the electrical circuitry comprising one or more of: a resistor, a capacitor, a switch, and an amplifier, wherein the first electrical circuitry is independent from a second electrical circuitry, the second electrical circuitry configured for driving the ultrasonic transducer or detecting motion of the diaphragm; and damping the motion of the ultrasonic transducer using the first electrical circuitry. In some embodiments, connecting a first electrical circuitry to the two or more of the plurality of electrical ports comprises connecting a resistor and a capacitor in series to the two or more of the plurality of electrical ports. In some embodiments, connecting a first electrical circuitry to the two or more of the plurality of electrical ports comprises connecting a switch, a resistor, and a capacitor in series to the to the two or more of the plurality of electrical ports. In some embodiments, the plurality of electrical ports comprises at least one port above the piezoelectric element. In some embodiments, the plurality of electrical ports comprises at least one port below the piezoelectric element. In some embodiments, the plurality of electrical ports comprises two ports or three ports. In some embodiments, the plurality of electrical ports comprises four ports, five ports, six ports, or any other number of ports.

Certain Definitions

Unless otherwise defined, all technical terms used herein have the same meaning as commonly understood by one of ordinary skill in the art to which this invention belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 10%, 5%, or 1%, including increments therein.

In some embodiments, a port herein includes an independent electrical connection to a transducer element. The connection is independent electrically from the other ports, but can be coupled to the other ports via the transducer element. In some embodiments, a port herein includes an electrode, an electrical conductor, for example, of piezoelectric or capacitive transducers. In some embodiments, a port herein is electrically connected to an electrode. In some embodiments, a port herein includes an electrode and an electrical connection to the electrode. The port may take other forms, though. For example, in the case of a piezo-resistive transducer, the port is a low resistance electrical contact to the piezo-resistive element.

In some embodiments, the systems herein include 2, 3, 4, 5, 6, or even more ports. In some embodiments, the systems herein include 2, 3, 4, 5, 6, or even more ports that are connected to the piezoelectric element. In some embodiments, the systems herein include 1, 2, 3, 4, 5, 6, or even more ports above the piezoelectric element above or below the piezoelectric element. In some embodiments, the port(s) for damping or improvement of Q is separate from the port(s) for driving the transducer or sensing ultrasound signals. In some embodiments, the port(s) for damping or improvement of Q is shared for driving the transducer or sensing ultrasound signals.

In some embodiments, damping herein includes energy loss, for example, while the diaphragm of a transducer is in motion. In some embodiments, damping includes reducing a Q of a transducer. In some embodiments, Q-spoiling herein includes reducing a Q of a transducer. In some embodiments, "damping," "reducing a Q," and "Q-spoiling" of a transducer are interchangeable herein.

In some embodiments, a harmonic herein is of an ultrasonic wave. In some embodiments, a harmonic is with a frequency that is approximately a positive integer multiple of the frequency of the original wave, known as the fundamental frequency. The original wave can also be called the first harmonic or the primary harmonic, the following harmonics are known as higher harmonics.

Damping a pMUT with a Circular Diaphragm and Two Semicircular Electrodes

Figure 1A:
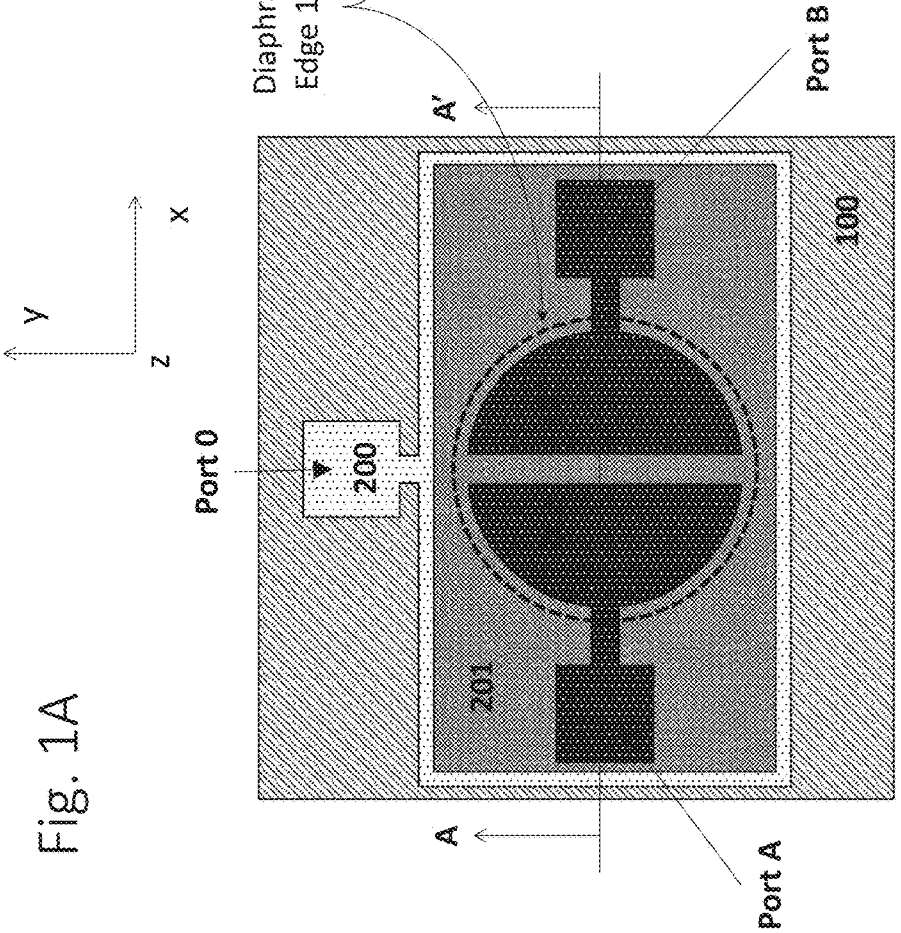

FIGS. 1A-1B shows the layout view (FIG. 1A, at B-B' of FIG. 1B) and cross-section view (FIG. 1B, at A-A' of FIG. 1A) of a pMUT including a substrate 100 with a membrane or diaphragm 101 formed by a substrate etch. The diaphragm edge 101*a* is substantially circular in layout. On top of the substrate 100 is a dielectric 102, and a piezoelectric film 201 sandwiched between a bottom conductor or electrode 200 and top conductors or electrodes 202 and 203. In this embodiment, the bottom electrode 200 is rectangular and the top electrodes 202 and 203 are approximately semicircular. In this embodiment, each conductor or electrode, 200, 202, and 203 are either connected to or part of a port, i.e., Port 0, and Ports A-B. In this embodiment, one or more discrete conductors 200, 202, and 203 are an electrode and a port, as signified by the square pad which might represent a connection point (for example, via a wirebond).

In this embodiment, the pMUT generates ultrasonic waves by converting an out-of-plane (e.g., along z axis) electric field between the bottom and top conductors or electrodes into an in-plane strain (e.g., within x-y plane) which flexes the membrane, e.g., 101 in FIGS. 3A-3B. Thus, the pMUT transduces electrical charge into mechanical motion, typically ultrasonic waves.

Figure 2:
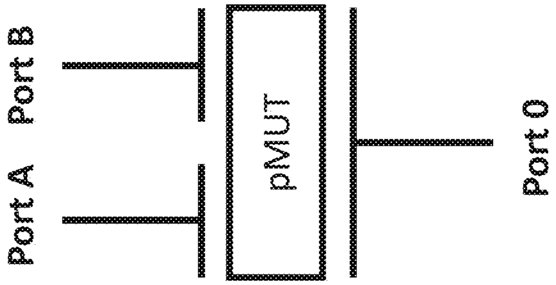
FIG. 2 shows an exemplary electrical figure for a three-port electrically coupled ultrasonic transducer.

An example of an equivalent circuit diagram with circuit elements including the pMUT and three ports in FIGS. 1A-1B is shown in FIG. 2. In some embodiments, the transfer function between the ports varies by transducer type and drive mode. For the pMUT in FIGS. 1A-1B, for example, the primary diaphragm mode (referred to as the "Primary drum mode" in FIG. 3A) and its first asymmetric harmonic are shown in FIGS. 3A and 3B, respectively. In this embodiment, the films (e.g., on the substrate and diaphragm) are not shown in FIGS. 3A-3B, but the electrodes of Ports A and B are overlaid on the layout views. In the layout views (bottom of FIGS. 3A-3B), deflection of the diaphragm or membrane is depicted by grey level, with black as maximum positive deflection, and white as minimum deflection. In the case of the fundamental harmonic (e.g., FIG. 3A), Port A and Port B have the same electrical response. In the case of the first asymmetric harmonic (e.g., FIG. 3B), Port B develops approximately an equal but opposite variable charge compared to Port A.

In some embodiments, a transducer connects two or more energy domains. Thus, modifications to one domain may result in modifications of one or more of the other domains via the transducer. For example, adding electrical circuit elements that modify the electrical domain can affect the other energy domain (e.g., the mechanical domain in the pMUT's case).

FIGS. 4A-4C shows nonlimiting exemplary embodiments of the systems and methods for Q-spoiling of a three-port pMUT as shown in FIGS. 1A-1B. During operation, the pMUT develops charge proportional to the deflection of the diaphragm. The velocity of the diaphragm results in a changing charge across the pMUT capacitor. If a constant voltage is held across the pMUT (e.g., from Port 0 to Port B), a current is developed from the voltage source. The current is proportional to the velocity of the diaphragm. In some embodiments, the resistor herein is the energy loss element. By adding a resistor between Port B and Port 0, energy loss and damping is added between the two ports. In some embodiments, this energy loss is only desired when the diaphragm is moving; that is, when current is developed. In some embodiments, to achieve this, a high-pass circuit is form by adding a capacitor in series with the resistor between Port B and Port 0, as illustrated in FIG. 4A. In this embodiment, the mechanical element(s) of the pMUT develop kinetic energy with the diaphragm moving. In some embodiments, the mechanical elements of the pMUT include but are not limited to: the diaphragm, substrate, film(s) on the substrate and/or diaphragm. Such kinetic energy is lost via mechanical damping. As the pMUT also develops a current between Port 0 and Port B related to the mechanical movement of the diaphragm, the added resistor removes energy from the pMUT, which is reflected in the mechanical element(s) as additional damping. In this embodiment, the electrical damping functions equivalently as the mechanical damping. In this embodiment, the transducer can be used as a standard pMUT with no changes between Port A and Port 0. With the addition of the resistor and capacitor in series between Port B and Port 0, damping is effectively added to the pMUT. In some embodiments, by adjusting the value of the resistance, R, the equivalent damping of the mechanical element(s) of the pMUT can be regulated.

In some embodiments, because the resistor removes energy as long as current is flowing, regardless of the direction of the current flow, the series RC circuit of FIG. 4A is effective with regard to both harmonics shown in FIGS. 3A and 3B. For more complex modes or higher harmonics, the damping from the resistor may depend on how much current flows between Port B and Port 0 for that given mode of operation.

In some embodiments, when damping needs to be added after a set event, as shown in FIG. 4B, a switch is placed between the series RC circuit and Port B. In some embodiments, the switch is activated only when desired.

Alternatively, if ceasing all mechanical motion after a set time, one can use the switch from FIG. 4B, but make the RC circuit a dead short as shown in FIG. 4C. In this embodiment, when the switch is closed, the dead short forces the voltage across the piezoelectric material to be zero and the Port B electrode resists motion.

Figure 5B:
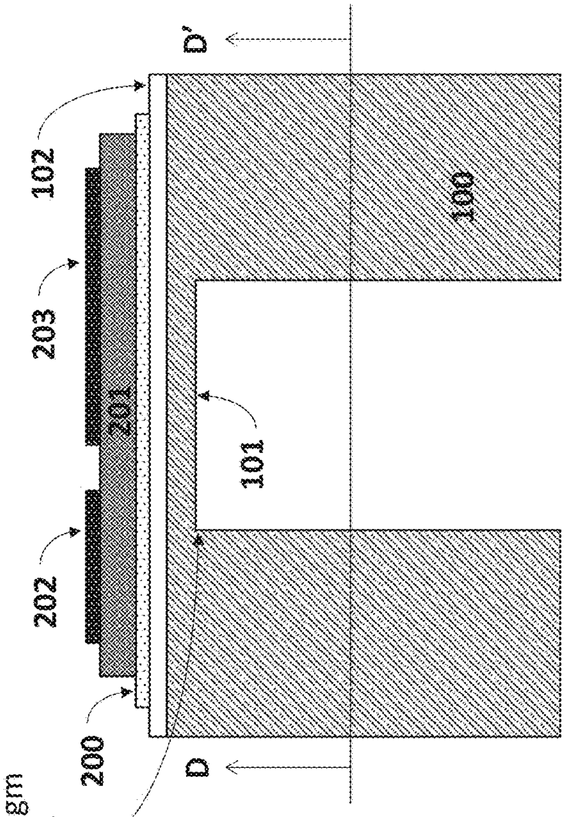
FIGS. 5A-5B show layout and cross-section views of an exemplary embodiment of an ultrasonic transducer system herein; in this case; a circular diaphragm pMUT with a circular central electrode surrounded by an annular outer electrode.
Figure 5A:
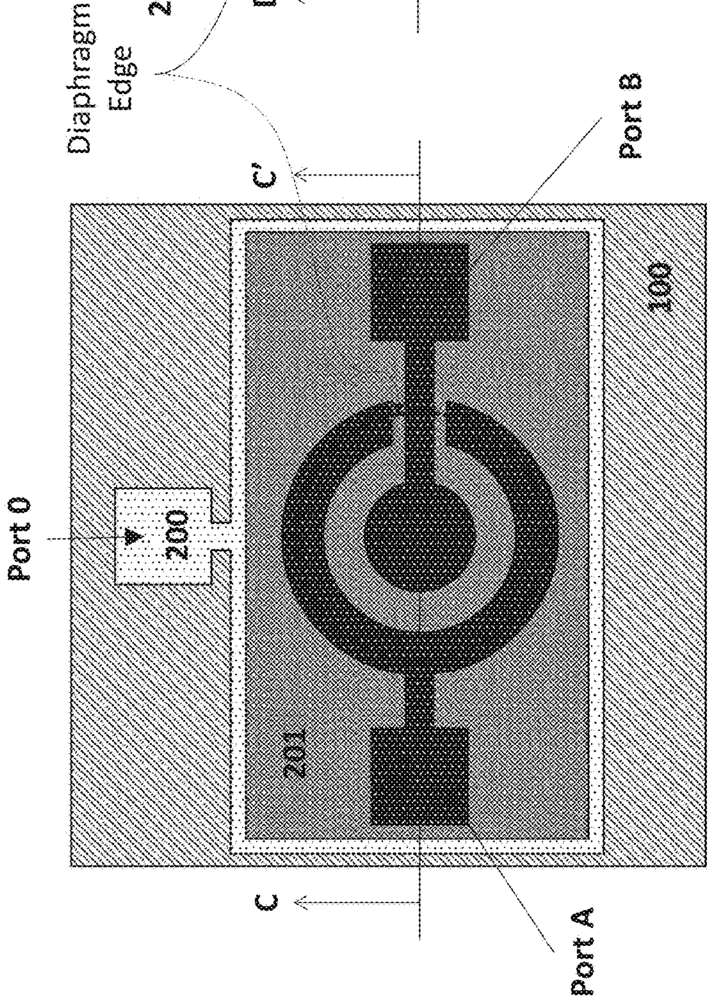

Damping a pMUT with a Circular Diaphragm and a Circular Electrode Surrounded by an Annular Electrode FIGS. 5A-5B shows the layout view (FIG. 5A, at D-D' of FIG. 5B) and cross-section view (FIG. 5B, at C-C' of FIG. 5A) of a pMUT including a substrate 100 with a membrane or diaphragm 101 formed by a substrate etch. The diaphragm edge 101*a* is substantially circular in layout. On top of the substrate 100 is a dielectric 102, and a piezoelectric film 201 sandwiched between a bottom conductor 200 and top conductors 202 and 203. In this embodiment, the pMUT generates ultrasonic waves by converting an out-of-plane (e.g., along z axis) electric field between the bottom and top conductors into an in-plane strain (e.g., within x-y plane) which flexes the membrane, e.g., 101 in FIGS. 6A-6B. Thus, the pMUT transduces electrical charge into mechanical motion, typically ultrasonic waves.

An exemplary equivalent circuit diagram with circuit elements including the pMUT and three ports of FIGS. 5A-5B is shown in FIG. 2. In some embodiments, the transfer function between the ports varies by transducer type and drive mode. For the pMUT in FIGS. 5A-5B for example, the primary diaphragm mode (referred to as the "Primary drum mode" in FIG. 6A) and its first symmetric harmonic are shown in FIGS. 6A and 6B, respectively. In this embodiment, the films (e.g., on the substrate and diaphragm) are not shown in FIGS. 6A-6B, but the electrodes of Ports A and B are overlaid on the layout views. In the layout views (bottom of FIGS. 6A-6B), deflection of the diaphragm or membrane (top of FIGS. 6A-6B) is depicted by grey level, with black as maximum positive deflection, and white as minimum deflection. In the case of the fundamental harmonic (e.g., FIG. 6A), Port A and Port B have approximately equal but opposite variable charges. In the case of the first symmetric harmonic (e.g., FIG. 6B), Port B develops approximately the same variable charge as that of Port A.

FIGS. 4A-4C shows nonlimiting exemplary embodiments of the systems and methods for Q-spoiling of a three-port pMUT as shown in FIGS. 5A-5B. In some embodiments, damping herein is defined as energy loss, for example, while the diaphragm is in motion. During operation, the pMUT develops charge proportional to the deflection of the diaphragm. The velocity of the diaphragm results in a changing charge across the pMUT capacitor. If a constant voltage is held across the pMUT (e.g., from Port 0 to Port B), a current is developed from the voltage source. The current is proportional to the velocity of the diaphragm. In some embodiments, the resistor herein is the energy loss element. By adding a resistor between Port B and Port 0, energy loss and damping is added between the two ports. In some embodiments, this energy loss is only desired when the diaphragm is moving; that is, when current is developed. In some embodiments, to achieve this, a high-pass circuit is formed by adding a capacitor in series with the resistor between Port B and Port 0, as illustrated in FIG. 4A. In this embodiment, the mechanical element(s) of the pMUT develop kinetic energy with the diaphragm moving. Such kinetic energy is lost via mechanical damping. As the pMUT also develops a current between Port 0 and Port B related to the mechanical movement of the diaphragm, the added resistor removes energy from the pMUT, which is reflected in the mechanical element(s) as additional damping. In this embodiment, the electrical damping functions equivalently as the mechanical damping. In this embodiment, the transducer can be used as a standard pMUT with no changes between Port A and Port 0. With the addition of the resistor and capacitor in series between Port B and Port 0, damping is effectively added to the pMUT. In some embodiments, by adjusting the value of the resistance, R, the equivalent damping of the mechanical element(s) of the pMUT can be regulated.

In some embodiments, because the resistor removes energy as long as current is flowing, regardless of the direction of the current flow, the series RC circuit of FIG. 4A is effective with regard to both harmonics shown in FIGS. 6A and 6B. For more complex modes or higher harmonics, the damping from the resistor may depend on how much current flows between Port B and Port 0 for that given mode of operation.

In some embodiments, when damping needs to be added after a set event, as shown in FIG. 4B, a switch is placed between the series RC circuit and Port B. In some embodiments, the switch is activated only when desired.

Alternatively, if ceasing all mechanical motion after a set time, one can use the switch from FIG. 4B, but make the RC circuit a dead short as shown in FIG. 4C. In this embodiment, when the switch is closed, the dead short forces the voltage across the piezoelectric material to be zero and the Port B electrode resists motion.

Damping a pMUT with a Rectangular Diaphragm and Two Rectangular Electrodes

Figure 7B:
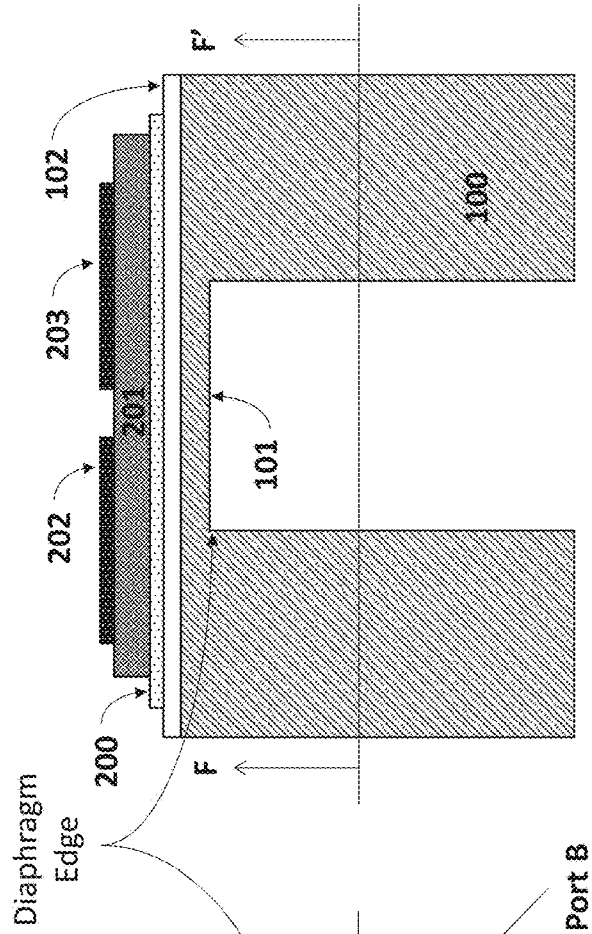
FIGS. 7A-7B show layout and cross-section views of an embodiment of an ultrasonic transducer system herein; in this case, a pMUT with a rectangular diaphragm with two side-by-side rectangular top electrodes.
Figure 7A:
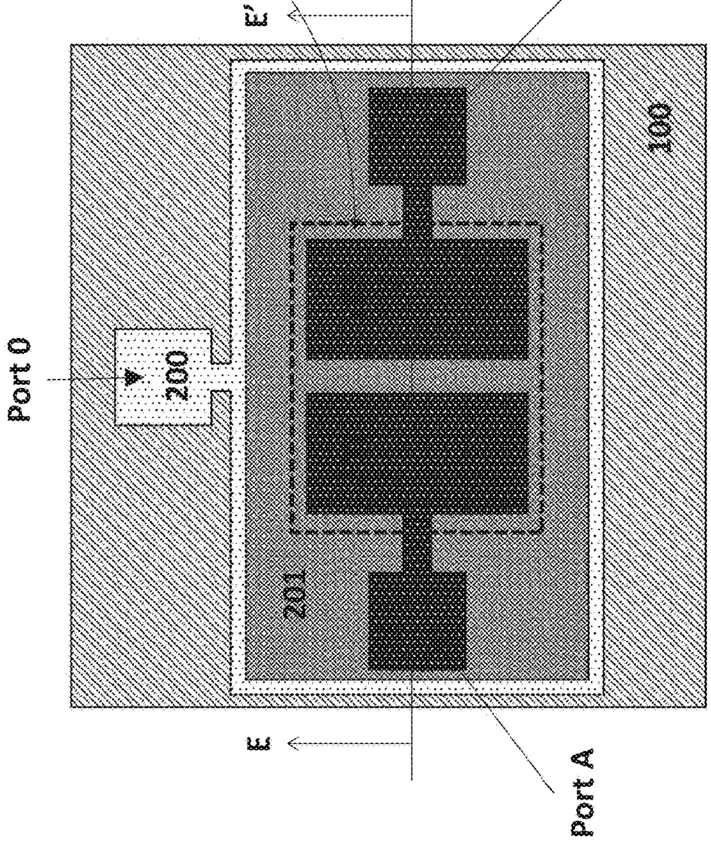

FIG. 7 shows the layout view (left, at F-F' of the cross-section view) and cross-section view (right, at E-E' of the lay out view) of a pMUT including a substrate 100 with a membrane or diaphragm 101 formed by a substrate etch. The diaphragm edge 101*a* is substantially rectangular in layout. On top of the substrate 100 is a dielectric 102, and a piezoelectric film 201 sandwiched between a bottom conductor 200 and top conductors 202 and 203. In this embodiment, the pMUT generates ultrasonic waves by converting an out-of-plane (e.g., along z axis) electric field between the bottom and top conductors into an in-plane strain (e.g., within x-y plane) which flexes the membrane, e.g., 101 in FIGS. 8A-8B. Thus, the pMUT transduces electrical charge into mechanical motion, typically ultrasonic waves.

An exemplary equivalent circuit diagram with circuit elements including the pMUT and three ports of FIG. 7 is shown in FIG. 2. In some embodiments, the transfer function between the ports varies by transducer type and drive mode.

For the pMUT in FIG. 7, for example, the primary diaphragm mode (referred to as the "Primary drum mode" in FIG. 8A) and its first asymmetric harmonic are shown in FIGS. 8A and 8B, respectively. In this embodiment, the films (e.g., on the substrate and diaphragm) are not shown, but the electrodes of Ports A and B are overlaid on the layout views. In the layout views (bottom of FIGS. 8A-8B), deflection of the diaphragm or membrane (top of FIGS. 8A-8B) is depicted by grey level, with black as maximum positive deflection, and white as minimum deflection. In the case of the fundamental harmonic (e.g., FIG. 8A), Port B develops approximately the same variable charge as that of Port A. In the case of the first asymmetric harmonic (e.g., FIG. 8B), Port B develops approximately equal but opposite variable charges.

FIGS. 4A-4C shows nonlimiting exemplary embodiments of the systems and methods for Q-spoiling of a three-port pMUT as shown in FIG. 7. In some embodiments, damping herein is defined as energy loss, for example, while the diaphragm is in motion. During operation, the pMUT develops charge proportional to the deflection of the diaphragm. The velocity of the diaphragm results in a changing charge across the pMUT capacitor. If a constant voltage is held across the pMUT (e.g., from Port 0 to Port B), a current is developed from the voltage source. The current is proportional to the velocity of the diaphragm. In some embodiments, the resistor herein is the energy loss element. By adding a resistor between Port B and Port 0, energy loss and damping is added between the two ports. In some embodiments, this energy loss is only desired when the diaphragm is moving; that is, when current is developed. In some embodiments, to achieve this, a high-pass circuit is form by adding a capacitor in series with the resistor between Port B and Port 0, as illustrated in FIG. 4A. In this embodiment, the mechanical element(s) of the pMUT develop kinetic energy with the diaphragm moving. Such kinetic energy is lost via mechanical damping. As the pMUT also develops a current between Port 0 and Port B related to the mechanical movement of the diaphragm, the added resistor removes energy from the pMUT, which is reflected in the mechanical element(s) as additional damping. In this embodiment, the electrical damping functions equivalently as the mechanical damping. In this embodiment, the transducer can be used as a standard pMUT with no changes between Port A and Port 0. With the addition of the resistor and capacitor in series between Port B and Port 0, damping is effectively added to the pMUT. In some embodiments, by adjusting the value of the resistance, R, the equivalent damping of the mechanical element(s) of the pMUT can be regulated.

In some embodiments, because the resistor removes energy as long as current is flowing, regardless of the direction of the current flow, the series RC circuit of FIG. 4A is effective with regard to both harmonics shown in FIGS. 8A and 8B. For more complex modes or higher harmonics, the damping from the resistor may depend on how much current flows between Port B and Port 0 for that given mode of operation.

In some embodiments, when damping needs to be added after a set event, as shown in FIG. 4B, a switch is placed between the series RC circuit and Port B. In some embodiments, the switch is activated only when desired.

Alternatively, if ceasing all mechanical motion after a set time, one can use the switch from FIG. 4B, but make the RC circuit a dead short as shown in FIG. 4C. In this embodiment, when the switch is closed, the dead short forces the voltage across the piezoelectric material to be zero and the Port B electrode resists motion.

Figure 9B:
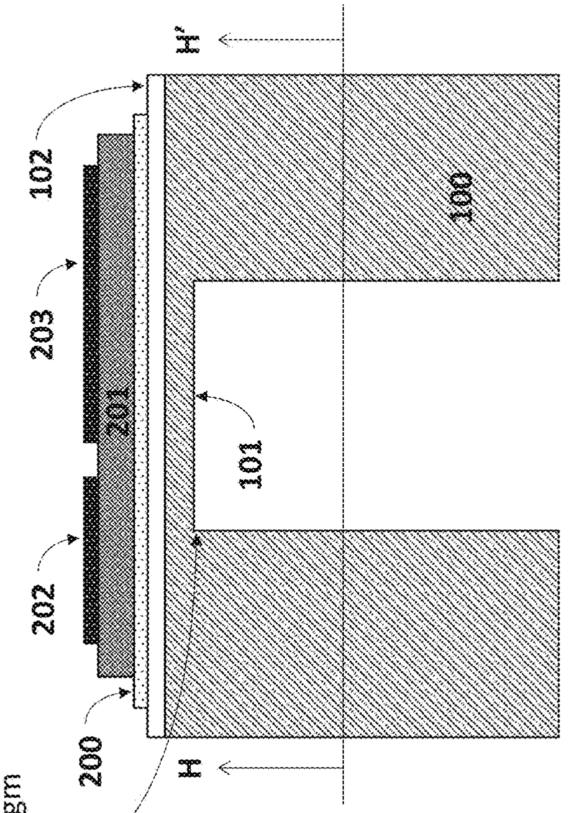
FIGS. 9A-9B shows layout and cross-section views of an embodiment of the ultrasonic transducer system herein, in this case; a pMUT with a rectangular diaphragm, a rectangular inner electrode surrounded by a rectangular annular outer electrode.
Figure 9A:
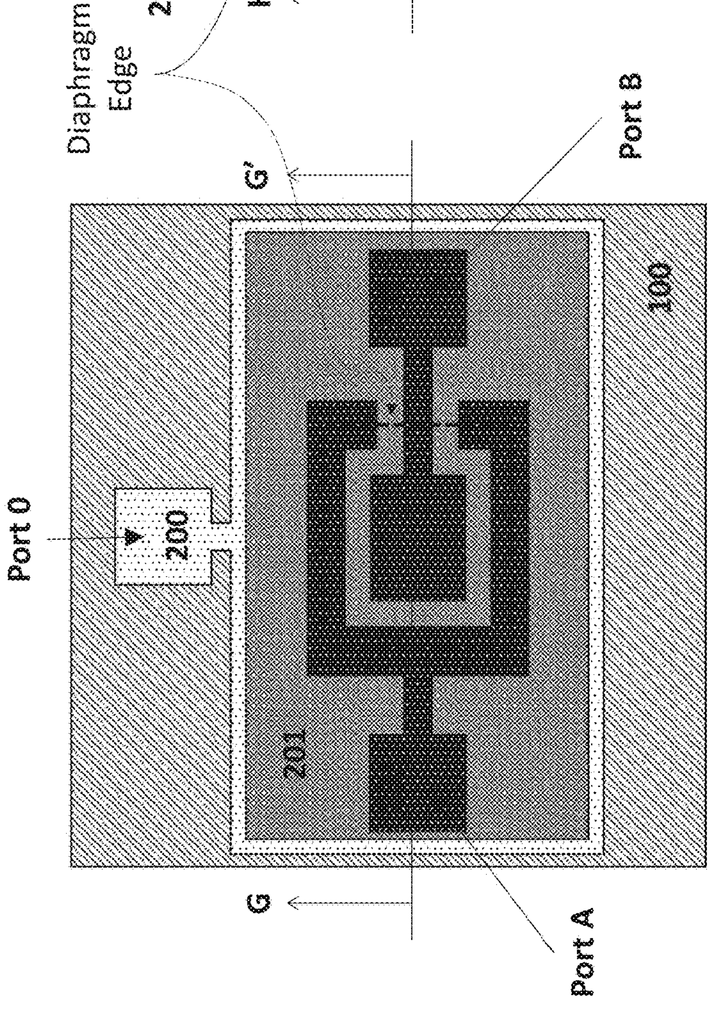

Damping a pMUT with a Rectangular Diaphragm and a Rectangular Electrode Surrounded by a Rectangular Annular Electrode FIGS. 9A-9B shows the layout view (FIG. 9A, at H-H' of FIG. 9B) and cross-section view (FIG. 9B, at G-G' of FIG. 9A) of a pMUT including a substrate 100 with a membrane or diaphragm 101 formed by a substrate etch. The diaphragm edge 101*a* is substantially rectangular in layout. On top of the substrate 100 is a dielectric 102, and a piezoelectric film 201 sandwiched between a bottom conductor 200 and top conductors 202 and 203. In this embodiment, the pMUT generates ultrasonic waves by converting an out-of-plane (e.g., along z axis) electric field between the bottom and top conductors into an in-plane strain (e.g., within x-y plane) which flexes the membrane, e.g., 101 in FIGS. 10A-10B. Thus, the pMUT transduces electrical charge into mechanical motion, typically ultrasonic waves.

An exemplary equivalent circuit diagram with circuit elements including the pMUT and three ports of FIGS. 9A-9B is shown in FIG. 2. In some embodiments, the transfer function between the ports varies by transducer type and drive mode.

For the pMUT in FIGS. 9A-9B, for example, the primary diaphragm mode (referred to as the "Primary drum mode" in FIG. 10A) and its first symmetric harmonic are shown in FIGS. 10A and 10B, respectively. In this embodiment, the films (e.g., on the substrate and diaphragm) are not shown, but the electrodes of Ports A and B are overlaid on the layout views. In the layout views (bottom of FIGS. 10A-10B), deflection of the diaphragm or membrane (top of FIGS. 10A-10B) is depicted by grey level, with black as maximum positive deflection, and white as minimum deflection. In the case of the fundamental harmonic (e.g., FIG. 10A), Port A and Port B develop approximately equal but opposite variable charges. In the case of the first symmetric harmonic (e.g., FIG. 10B), Port B develops approximately the same variable charge as that of Port A.

FIGS. 4A-4C shows nonlimiting exemplary embodiments of the systems and methods for Q-spoiling of a three-port pMUT as shown in FIGS. 9A-9B. In some embodiments, damping herein is defined as energy loss, for example, while the diaphragm is in motion. During operation, the pMUT develops charge proportional to the deflection of the diaphragm. The velocity of the diaphragm results in a changing charge across the pMUT capacitor. If a constant voltage is held across the pMUT (e.g., from Port 0 to Port B), a current is developed from the voltage source. The current is proportional to the velocity of the diaphragm. In some embodiments, the resistor herein is the energy loss element. By adding a resistor between Port B and Port 0, energy loss and damping is added between the two ports. In some embodiments, this energy loss is only desired when the diaphragm is moving; that is, when current is developed. In some embodiments, to achieve this, a high-pass circuit is form by adding a capacitor in series with the resistor between Port B and Port 0, as illustrated in FIG. 4A. In this embodiment, the mechanical element(s) of the pMUT develop kinetic energy with the diaphragm moving. Such kinetic energy is lost via mechanical damping. As the pMUT also develops a current between Port 0 and Port B related to the mechanical movement of the diaphragm, the added resistor removes energy from the pMUT, which is reflected in the mechanical element(s) as additional damping. In this embodiment, the electrical damping functions equivalently as the mechanical damping. In this embodiment, the transducer can be used as a standard pMUT with no changes between Port A and Port 0. With the addition of the resistor and capacitor in series between Port B and Port 0, damping is effectively added to the pMUT. In some embodiments, by adjusting the value of the resistance, R, the equivalent damping of the mechanical element(s) of the pMUT can be regulated.

In some embodiments, because the resistor removes energy as long as current is flowing, regardless of the direction of the current flow, the series RC circuit of FIG. 4A is effective with regard to both harmonics shown in FIGS. 10A and 10B. For more complex modes or higher harmonics, the damping from the resistor may depend on how much current flows between Port B and Port 0 for that given mode of operation.

In some embodiments, when damping needs to be added after a set event, as shown in FIG. 4B, a switch is placed between the series RC circuit and Port B. In some embodiments, the switch is activated only when desired.

Alternatively, if ceasing all mechanical motion after a set time, one can use the switch from FIG. 4B, but make the RC circuit a dead short as shown in FIG. 4C. In this embodiment, when the switch is closed, the dead short forces the voltage across the piezoelectric material to be zero and the Port B electrode resists motion.

Damping a pMUT with Two Ports

For any pMUT with only two ports, e.g., one top and one bottom electrode, damping can also be added using the resistor-capacitor circuit (RC circuit) herein. In the case with two ports, the specific layout of the RC circuit is less important, but the damping mechanism remains similar as in other embodiments herein.

FIGS. 11A-11C shows nonlimiting exemplary embodiments of the systems and methods for Q-spoiling of a two-port transducer (e.g., pMUT). In some embodiments, damping herein is defined as energy loss, for example, while the diaphragm is in motion. During operation, the transducer develops charge proportional to the deflection of the diaphragm. The velocity of the diaphragm results in a changing charge across the transducer capacitor. If a constant voltage is held across the the transducer (e.g., from Port 0 to Port A), a current is developed from the voltage source. The current is proportional to the velocity of the diaphragm. In some embodiments, the resistor herein is the energy loss element. By adding a resistor between Port A and Port 0, energy loss and damping is added between the two ports. In some embodiments, this energy loss is only desired when the diaphragm is moving; that is, when current is developed. In some embodiments, to achieve this, a high-pass circuit is form by adding a capacitor in series with the resistor between Port A and Port 0, as illustrated in FIG. 11A. In this embodiment, the mechanical element(s) of the transducer develop kinetic energy with the diaphragm moving. Such kinetic energy is lost via mechanical damping. As the transducer also develops a current between Port 0 and Port A related to the mechanical movement of the diaphragm, the added resistor removes energy from the transducer, which is reflected in the mechanical element(s) as additional damping. In this embodiment, the electrical damping functions equivalently as the mechanical damping. With the addition of the resistor and capacitor in series between Port A and Port 0, damping is effectively added to the transducer. In some embodiments, by adjusting the value of the resistance, R, the equivalent damping of the mechanical element(s) of the transducer can be regulated.

In some embodiments, because the resistor removes energy as long as current is flowing, regardless of the direction of the current flow, the series RC circuit of FIG. 11A is effective with regard to harmonics, e.g., wave forms under the prime drum mode or the first harmonic. For more complex modes or higher harmonics, the damping from the resistor may depend on how much current flows between Port A and Port 0 for that given mode of operation.

In some embodiments, when damping needs to be added after a set event, as shown in FIG. 11B, a switch is placed between the series RC circuit and Port A. In some embodiments, the switch is activated only when desired.

Alternatively, if ceasing all mechanical motion after a set time, one can use the switch from FIG. 11B, but make the RC circuit a dead short as shown in FIG. 11C. In this embodiment, when the switch is closed, the dead short forces the voltage across the piezoelectric material to be zero and the Port A electrode resists motion.

In some embodiments, the downside of added damping in the two port transducer is that the added RC circuit loads the drive or sense circuit used to communicate with the transducer. In some embodiments, the added load to the drive or sense circuit may have deleterious effects on the performance of the transducer.

In some embodiments, to prevent the RC circuit from loading the drive/sense circuit, a switch as illustrated in FIG. 11B can be added. In some embodiments, the drive/sense circuit is configured to enable functions of the transducer. For ultrasound imaging and distancing applications, for example, the drive circuit can be used but to drive the transducer into large oscillation to create a pressure wave that radiates away from the transducer into a medium (such as air or living tissue). The sense circuit can be used but is not limited to measure minute vibrations on the diaphragm created from the drive waves reflecting off objects and returning to the diaphragm. In a switched RC circuit case, the RC circuit may be applied to the transducer after the drive and before the sense functions.

Referring to FIG. 11B, in this embodiment, while the RC circuit adds damping, the drive/sense circuit is disconnected from the transducer thereby preventing deleterious interactions. If one wishes to cease motion after a pre-determined time, the switch from FIG. 11B can be used and make the RC circuit a dead short. Referring to FIG. 11C, when the switch connects the dead short, the short forces the voltage across the piezoelectric material to be zero and the piezoelectric material resists changing strain its state, thus resisting motion of the mechanical elements of the transducer.

Damping a pMUT with an Arbitrary Number of Ports

In some embodiments, the pMUT system herein includes an arbitrary number of ports, e.g., an arbitrary number of electrodes above and below the piezoelectric material.

Figure 12B:
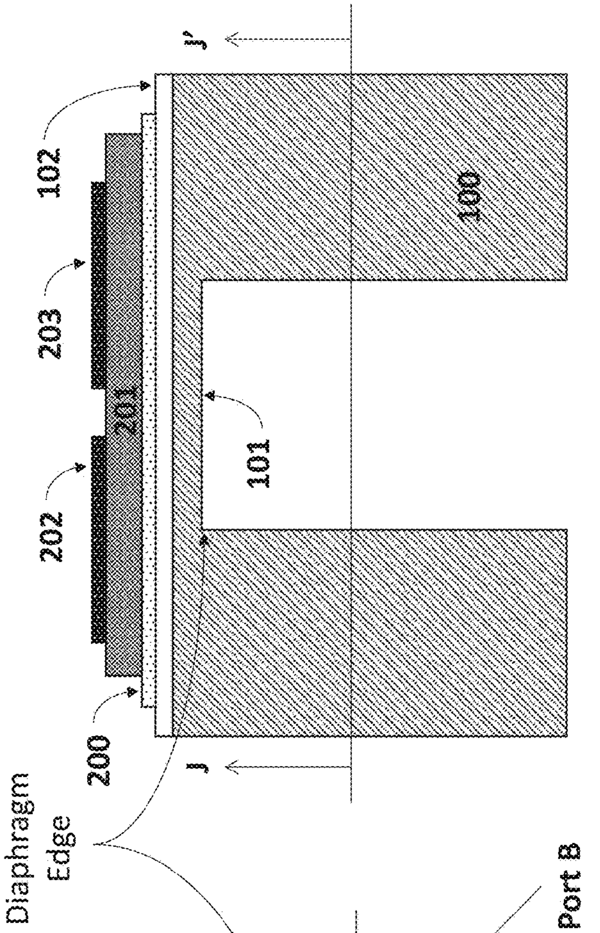
FIGS. 12A-12B show an exemplary embodiment of an ultrasonic transducer system herein; in this case, a pMUT with a circular diaphragm, six top ports and one bottom port, in layout and cross-section views.
Figure 12A:
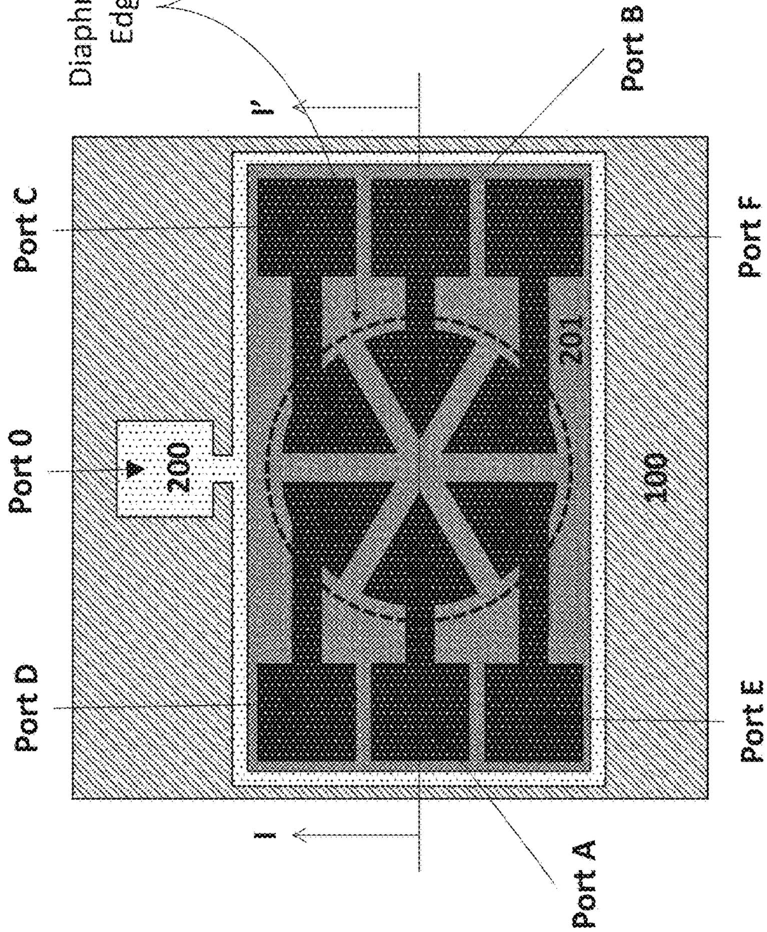
Figure 13:
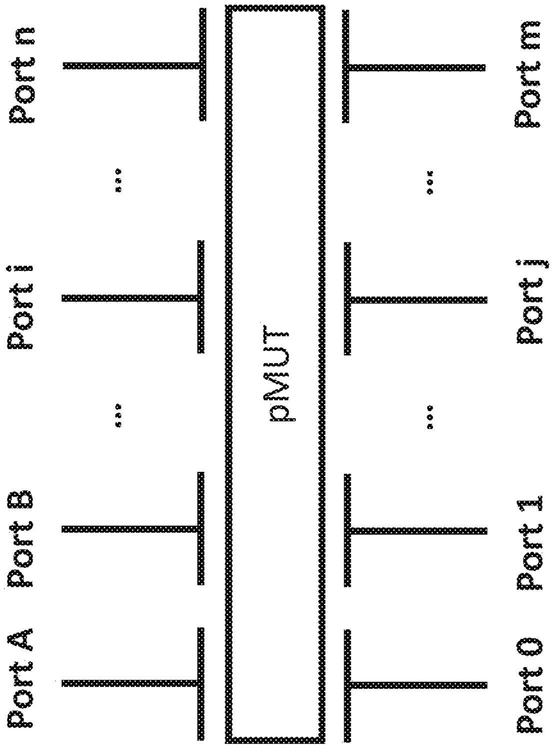
FIG. 13 shows an electrical figure for an electrically coupled ultrasonic transducer with arbitrary ports above and below the transducer element.

FIGS. 12A-12B illustrates a nonlimiting exemplary embodiment of an ultrasonic transducer system herein with 6 ports, i.e., Ports A-F, above the piezoelectric film 201 and one port Port 0 below the film and a circular diaphragm 201 in layout view (left, viewing from J-J' of the cross-section view) and cross-section view (right, viewing from I-I' of the layout view). In this embodiment, 6 ports, Ports A-F are independently connected with conductors, 202-207 respectively, while Port 0 is connected with a conductor 200. In some embodiments, damping manipulation disclosed herein can be readily extended to an arbitrary number of ports above and below the transducer element, for any shape diaphragms that can be imagined, including but not limited to simple circular and rectangular designs. The circuit diagram with circuit elements for an arbitrary number of ports in the pMUT system is shown in FIG. 13.

Figure 14:
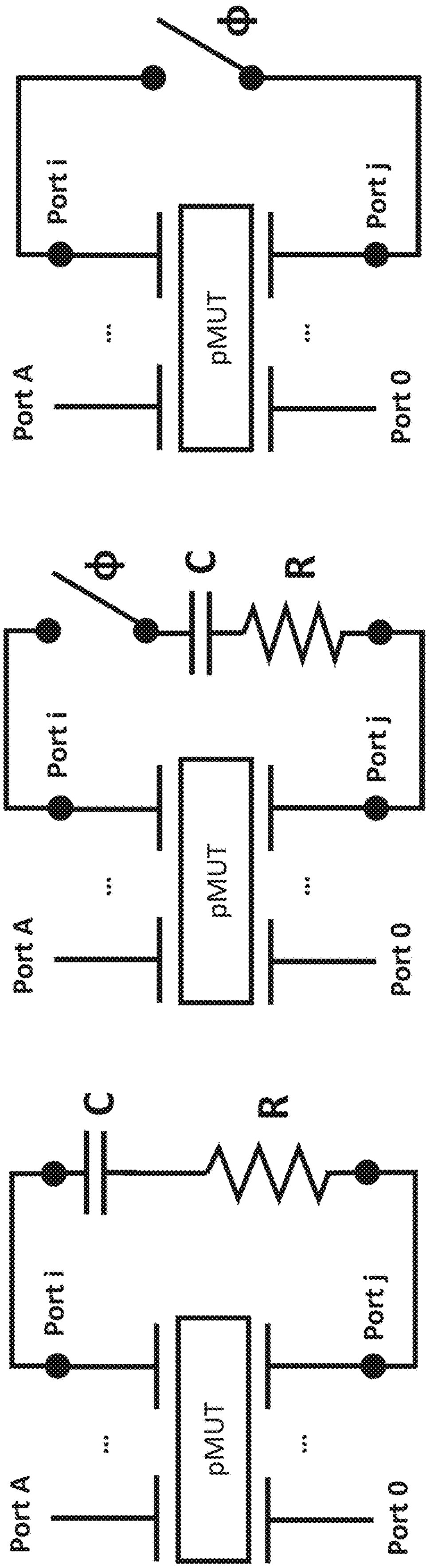
FIGS. 14A-14C show exemplary embodiments of Q-spoiling in an ultrasonic transducer system herein; in this case, in a pMUT system with an arbitrary number of ports.

In some embodiments, the same Q-damping procedures can be applied herein. Referring to FIG. 14A, a capacitively coupled resistor can be added to two ports, i.e., Ports H. If one wishes to add damping after a pre-determined event, a circuit similar to that in FIG. 14B can be used, where a switch Φ is placed between the RC circuit and Port i. In some embodiments, the switch is activated only when desired. Alternatively, if one wishes to cease all motion after a preset time, the switch from FIG. 14B can be used with a dead short as shown in FIG. 14C. Referring to FIG. 14C, in this particular embodiment, when the switch is closed, the dead short forces the voltage across the piezoelectric material to be zero and the piezoelectric material can resist motion.

Figure 15:
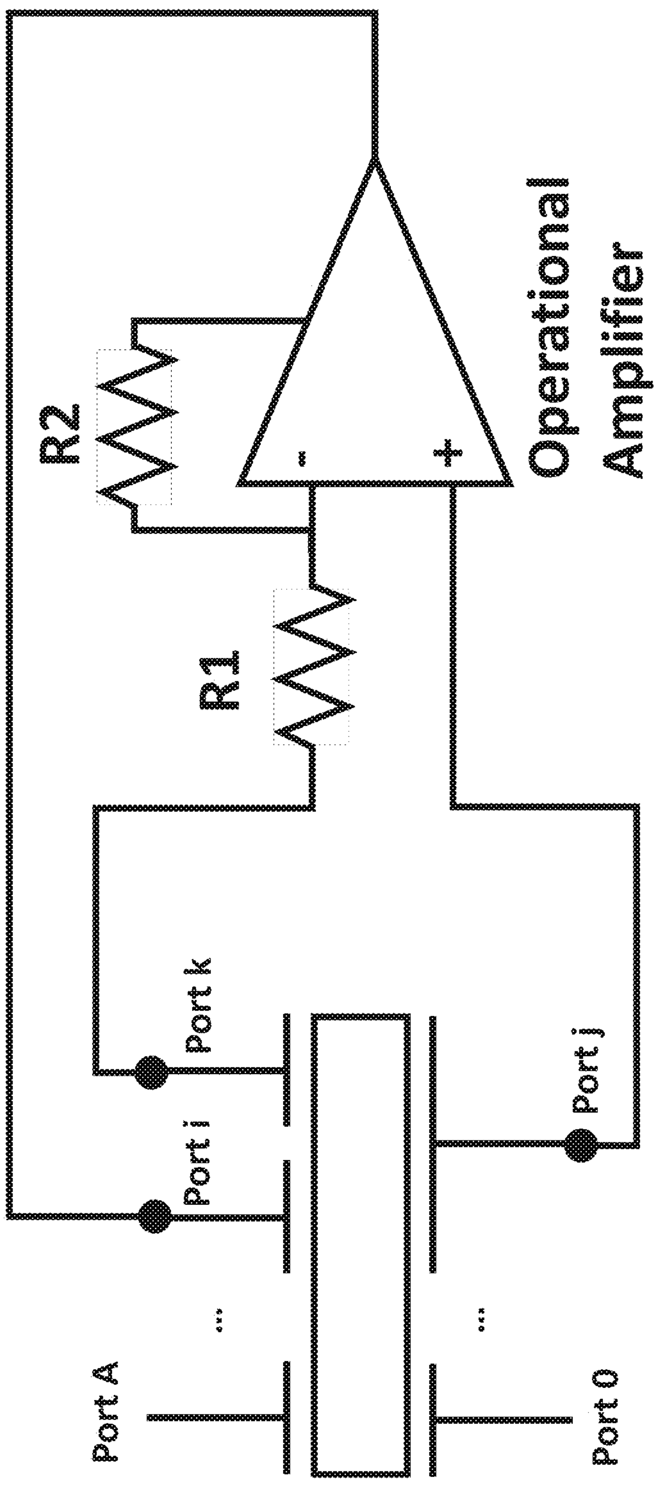
FIG. 15 shows exemplary embodiments of Q-spoiling in the pMUT with an arbitrary number of ports using active feedback.

In some embodiments, more complicated circuits can be included in the system disclosed herein. For example, as illustrated in FIG. 15, an inverting amplifier can be added to the pMUT system between Ports i, j, and k. The inverting amplifier may adjust its output voltage on Port i inversely proportional to the voltage across Port k and Port j. The ratio of R2 to R1 can determine the gain of the feedback such that Vout=−R2/R1*(Vport_k−Vport_j). Thus, the voltage is "inverted" from positive to negative. In this embodiment, when suppressing motion is desired (effectively reduce/damp Q) for the mode of operation in FIG. 3A, the amplifier can be connected to the transducing element such that Port 0 of FIG. 1A=Port j of FIG. 15, Port A=Port k, and port B=Port i. Thus, when the diaphragm starts to vibrate as in FIG. 3A, if a positive voltage develops on Port A, the inverting amplifier may drive a negative voltage on Port B. While Port A may be in tension, the inverting amplifier may drive Port B to input a compressive force, resisting the diaphragm deflection and thus damping out vibrations. For the mode depicted in FIG. 3B, the setup described (Port 0=Port j, Port A=Port k, and Port B=Port i) may result in increased vibrations and is analogous to an oscillator. Thus, the circuit may cause the mode of FIG. 3A to increase in intensity, rather than decrease.

In some embodiments, a proportional-integral-derivative (PID) controller can be added in the circuit which directly controls the mechanical transducer in a two port pMUT (e.g., FIG. 11A) or a three port pMUT (e.g., FIG. 4), but the drive/sense circuitry may suffer due to loading. To mitigate this, switch(es) can be added in a similar manner as shown in FIGS. 11B-11C. A PID controller is a form of closed-loop feedback that strives to force a system to respond in such a way that it matches a control signal. A PID controller controls the transducer by continuously calculating the difference, or error, between the desired set point and the system variable being controlled. The controller can apply feedback that is based on the error, e.g., proportional to this error. The controller may also respond to the rate of change of the error to reduce overshoot. Furthermore, the PID controller can integrate the error so that it may, in steady state, eventually eliminate the error entirely. In some embodiments, a PID controller requires a means to monitor the system, and a means of affecting the system. In the multi-port transducer herein, one or more port can be used for sensing the state of the system, while other port(s) or same port(s) can be used to modify the system behavior, similar to the way Ports k and j are used to monitor the system in FIG. 15, and Port i is used to modify the system behavior in FIG. 15. As another example in FIG. 3A, Port A may be used to monitor the system dynamics, and Port B to modulate the system with a voltage driver.

In some embodiments, the systems and methods illustrated here is not limited to pMUTs, but can be applied to any other type of transducer with multiple electrically coupled ports.

In some embodiments, the circuit element(s) applied to the multiple ports in FIGS. 4A-4C, 11A-11C, 14A-14C, and 15 can be selected and combined for functions or targets other than Q spoiling.

Although certain embodiments and examples are provided in the foregoing description, the inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

As used herein A and/or B encompasses one or more of A or B, and combinations thereof such as A and B. It will be understood that although the terms "first," "second," "third" etc. may be used herein to describe various elements, components, regions and/or sections, these elements, components, regions and/or sections should not be limited by these terms. These terms are merely used to distinguish one element, component, region or section from another element, component, region or section. Thus, a first element, component, region or section discussed below could be termed a second element, component, region or section without departing from the teachings of the present disclosure.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

As used in this specification and the claims, unless otherwise stated, the term "about," and "approximately," or "substantially" refers to variations of less than or equal to +/−0.1%, +/−1%, +/−2%, +/−3%, +/−4%, +/−5%, +/−6%, +/−7%, +/−8%, +/−9%, +/−10%, +/−11%, +/−12%, +/−14%, +/−15%, or +/−20%, including increments therein, of the numerical value depending on the embodiment. As a non-limiting example, about 100 meters represents a range of 95 meters to 105 meters (which is +/−5% of 100 meters), 90 meters to 110 meters (which is +/−10% of 100 meters), or 85 meters to 115 meters (which is +/−15% of 100 meters) depending on the embodiments.

While preferred embodiments have been shown and described herein, it will be obvious to those skilled in the art that such embodiments are provided by way of example only. Numerous variations, changes, and substitutions will now occur to those skilled in the art without departing from the scope of the disclosure. It should be understood that various alternatives to the embodiments described herein may be employed in practice. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the disclosure and that methods and structures within the scope of these claims and their equivalents be covered thereby.

What is claimed is:

1. An electrical transducer system comprising:

a) an electrical transducer comprising a substrate, a diaphragm, and a piezoelectric element;

b) a first electrical circuitry coupled to the electrical transducer, the first electrical circuitry configured for driving the electrical transducer or detecting motion of the diaphragm;

c) a plurality of electrical ports coupled to the electrical transducer; and d) a second electrical circuitry connected to two or more of the plurality of electrical ports, the second electrical circuitry comprising a switch being configured to leave one or more of the plurality of ports floating when open and short the one or more of the plurality of ports to a DC voltage when closed;

wherein the second electrical circuitry is independent from the first electrical circuitry, and wherein the second electrical circuitry is configured to dampen the motion of the diaphragm.

2. The electrical transducer system in claim 1, wherein the electrical transducer is selected from the group consisting of a capacitive transducer, a piezo-resistive transducer, a thermal transducer, an optical transducer, and a radioactive transducer.

3. The electrical transducer system in claim 1, wherein the second electrical circuitry comprises a resistor.

4. The electrical transducer system in claim 1, wherein the second electrical circuitry comprises a resistor coupled to the electrical transducer through a capacitor.

5. The electrical transducer system in claim 1, wherein the motion of the diaphragm is ceased when the switch is closed.

6. The electrical transducer system in claim 1, wherein the second electrical circuitry is activated when the diaphragm is in motion.

7. The electrical transducer system in claim 1, wherein the second electrical circuitry is not activated when the motion of diaphragm is less than a predetermined threshold.

8. The electrical transducer system in claim 1, wherein the plurality of electrical ports comprises at least one port above the piezoelectric element.

9. The electrical transducer system in claim 1, wherein the plurality of electrical ports comprises at least one port below the piezoelectric element.

10. The electrical transducer system in claim 1, wherein the plurality of electrical ports comprises two ports or three ports.

11. The electrical transducer system in claim 1, wherein the plurality of electrical ports comprises four ports, five ports, six ports, or any other integer number of ports.

12. An electrical transducer system comprising:

a) an electrical transducer comprising a substrate, a diaphragm, and a piezoelectric element;

b) a first electrical circuitry coupled to the electrical transducer, the first electrical circuitry configured for driving the electrical transducer or detecting motion of the diaphragm;

c) a plurality of electrical ports coupled to the electrical transducer; and d) a second electrical circuitry connected to two or more of the plurality of electrical ports, the second electrical circuitry comprising an amplifier that is configured to sense the motion of the diaphragm and utilizes active feedback to dampen the motion of the diaphragm based on the sensed motion of the diaphragm;

wherein the second electrical circuitry is independent from the first electrical circuitry.

13. The electrical transducer system in claim 12, wherein the electrical transducer is selected from the group consisting of a capacitive transducer, a piezo-resistive transducer, a thermal transducer, an optical transducer, and a radioactive transducer.

14. The electrical transducer system in claim 12, wherein the second electrical circuitry is activated when the diaphragm is in motion.

15. The electrical transducer system in claim 12, wherein the second electrical circuitry is not activated when the motion of diaphragm is less than a predetermined threshold.

16. The electrical transducer system in claim 12, wherein the plurality of electrical ports comprises at least one port above the piezoelectric element.

17. The electrical transducer system in claim 12, wherein the plurality of electrical ports comprises at least one port below the piezoelectric element.

18. The electrical transducer system in claim 12, wherein the plurality of electrical ports comprises two ports, three ports, four ports, five ports, six ports, or any other integer number of ports.

19. An electrical transducer system comprising:

a) an electrical transducer comprising a substrate, a diaphragm, and a piezoelectric element;

b) a first electrical circuitry coupled to the electrical transducer, the first electrical circuitry configured for driving the electrical transducer or detecting motion of the diaphragm;

c) a plurality of electrical ports coupled to the electrical transducer; and d) a second electrical circuitry connected to two or more of the plurality of electrical ports, the second electrical circuitry comprising a switch, a resistor, and a capacitor in series, wherein the switch is configured to leave one or more of the plurality of ports floating when open and short the one or more of the plurality of ports to the resistor and the capacitor when closed;

wherein the second electrical circuitry is independent from the first electrical circuitry, and wherein the second electrical circuitry is configured to dampen the motion of the diaphragm.

20. The electrical transducer system in claim 19, wherein the motion of the diaphragm is dampened when the switch is closed.

21. The electrical transducer system in claim 19, wherein the electrical transducer is selected from the group consisting of a capacitive transducer, a piezo-resistive transducer, a thermal transducer, an optical transducer, and a radioactive transducer.

22. The electrical transducer system in claim 19, wherein the second electrical circuitry is activated when the diaphragm is in motion.

23. The electrical transducer system in claim 19, wherein the second electrical circuitry is not activated when the motion of diaphragm is less than a predetermined threshold.

24. The electrical transducer system in claim 19, wherein the plurality of electrical ports comprises at least one port above the piezoelectric element.

25. The electrical transducer system in claim 19, wherein the plurality of electrical ports comprises at least one port below the piezoelectric element.

26. The electrical transducer system in claim 19, wherein the plurality of electrical ports comprises two ports, three ports, four ports, five ports, six ports, or any other integer number of ports.

* * * * *